US007733973B2

(12) United States Patent
Moriya et al.

(10) Patent No.: US 7,733,973 B2

(45) Date of Patent: Jun. 8, 2010

(54) MULTICHANNEL SIGNAL ENCODING METHOD, ITS DECODING METHOD, DEVICES FOR THESE, PROGRAM, AND ITS RECORDING MEDIUM

(75) Inventors: Takehiro Moriya, Tokyo (JP); Noboru Harada, Tokyo (JP); Yutaka Kamamoto, Tokyo (JP); Takuya Nishimoto, Tokyo (JP); Shigeki Sagayama, Tokyo (JP)

(73) Assignees: The University of Tokyo, Tokyo (JP); Nippon Telegraph and Telephone Corporation, Tokyo (JP)

( * ) Notice: Subject to any disclaimer, the term of this patent is extended or adjusted under 35 U.S.C. 154(b) by 637 days.

(21) Appl. No.: 11/631,019

(22) PCT Filed: Aug. 17, 2005

(86) PCT No.: PCT/JP2005/015015

§ 371 (c)(1),
(2), (4) Date: Dec. 28, 2006

(87) PCT Pub. No.: WO2006/019117

PCT Pub. Date: Feb. 23, 2006

(65) Prior Publication Data

US 2009/0190693 A1 Jul. 30, 2009

(30) Foreign Application Priority Data

Aug. 19, 2004 (JP) ............................ 2004-239665

(51) Int. Cl.
*H04L 23/02* (2006.01)

(52) U.S. Cl. ...................................................... 375/265

(58) Field of Classification Search ................. 375/299, 375/295, 347, 265; 382/251, 283; 358/430, 358/133; 704/205, 208, 221
See application file for complete search history.

(56) References Cited

U.S. PATENT DOCUMENTS 5,117,287 A * 5/1992 Koike et al. .............. 348/402.1

(Continued)

FOREIGN PATENT DOCUMENTS

EP 1 400 955 A 3/2004

(Continued)

OTHER PUBLICATIONS

Kamamoto Y. et al.: "Lossless Compression of Multi-Channel Signals Using Inter-Channel Correlation," Dai 3 Kai Forum on Information Technology Koen Ronbunshu, vol. M-016, Aug. 20, 2004, pp. 123-124, XP002997788.

(Continued)

*Primary Examiner*—Khai Tran
(74) *Attorney, Agent, or Firm*—Oblon, Spivak, McClelland, Maier & Neustadt, L.L.P.

(57) ABSTRACT

An object of the present invention is to efficiently perform weighted difference coding of two or more signals. Determination is made as to which of independent coding and weighted difference coding is to be used for each channel so that the total energy of the channel signals and weighted difference signals is minimized. A weighted difference signal is generated on the basis of the determination and a reference signal (parent) and a weight is generated as auxiliary codes, the difference signal is treated as an input channel signal, and the process of coding determination and difference signal and auxiliary code generation is repeated. The difference signal generated at the last iteration of the process and a signal to be coded by independent coding are compressive coded and the auxiliary codes generated at the iterations of the process are coded and outputted.

8 Claims, 23 Drawing Sheets

U.S. PATENT DOCUMENTS

2004/0161116 A1 8/2004 Tsuji et al.

FOREIGN PATENT DOCUMENTS

| | | | |
|---|---|---|---|
| EP | 1 764 923 | A1 | 3/2007 |
| JP | 8 123488 | | 5/1996 |
| JP | 10 56385 | | 2/1998 |
| JP | 2001 296894 | | 10/2001 |
| JP | 2003 195896 | | 7/2003 |
| JP | 2003-337598 | | 11/2003 |

OTHER PUBLICATIONS

Kamamoto et al.: "Lossless Compression of Multi-Channel Signals Using Inter-Channel Correlation," Joho Shori Gakkai Ronbunshi—Transactions of Information Processing Society of Japan, Tokyo, JP, vol. 46, No. 5, May 15, 2005, pp. 1118-1128, XP008077545, ISSN: 0387-5806 (with an English translation of the pertinent portion).

Konstantinos Konstantinides, "An Introduction to Super Audio CD and DVD-Audio", IEEE Signal Processing Magazine, pp. 71-82, 2003.

Mat Hans, et al., "Lossless Compression of Digital Audio", IEEE Signal Processing Magazine, vol. 18, No. 4, pp. 21-32, 2001.

* cited by examiner

FIG. 9A

| CHANNEL ID NUMBER $i$ | END FLAG $F_{EN}$ | SAME-AS-PREVIOUS-FRAME FLAG $F_R$ | PARENT CHANNEL $j$ | WEIGHTING FACTOR $W(i, j)$ | END FLAG $F_{EN}$ |
|---|---|---|---|---|---|
| 1 | 0 | 0 | 2 | 13 | 1 |
| 2 | 0 | 0 | 3 | 1 | 1 |
| 3 | 1 | | | | |
| 4 | 1 | | | | |
| 5 | 1 | | | | |
| 6 | 0 | 0 | 5 | 3 | 1 |

FIG. 9B

| | | | | | |
|---|---|---|---|---|---|
| 3 | 0 | 0 | 3 | 0 | 1 |

FIG. 9C

| | | | | | |
|---|---|---|---|---|---|
| 3 | 0 | 0 | 3 | | 1 |

48 WEIGHT MEMORY

| q | β(q)×128 | q | β(q)×128 | q | β(q)×128 | q | β(q)×128 |
|---|---|---|---|---|---|---|---|
| 0 | 204 | 8 | 102 | 16 | 0 | 24 | −102 |
| 1 | 192 | 9 | 89 | 17 | −12 | 25 | −115 |
| 2 | 179 | 10 | 76 | 18 | −25 | 26 | −128 |
| 3 | 166 | 11 | 64 | 19 | −38 | 27 | −140 |
| 4 | 153 | 12 | 51 | 20 | −51 | 28 | −153 |
| 5 | 140 | 13 | 38 | 21 | −64 | 29 | −166 |
| 6 | 128 | 14 | 25 | 22 | −76 | 30 | −179 |
| 7 | 115 | 15 | 12 | 23 | −89 | 31 | −192 |

| | NUMBER OF CHANNELS | WORD LENGTH | NUMBER OF SAMPLES PER CHANNEL | SAMPLING FREQUENCY |
|---|---|---|---|---|
| AUDIO SIGNAL | 2 | 24 bit | 21,600,000 | 48kHz |
| MICROPHONE ARRAY SIG | 8 | 16 bit | 2,646,000 | 44.1kHz |
| MAGNETOENCEPHALOGRAPH SIG (RAW DATA) | 256 | 16 bit | 40,000 | 2kHz |
| MAGNETOENCEPHALOGRAPH SIG (AVERAGED) | 256 | 16 bit | 600 | 2kHz |
| MAGNETOENCEPHALOGRAPH SIG (DENOISED) | 192 | 16 bit | 120,000 | 500Hz |

MULTICHANNEL SIGNAL ENCODING METHOD, ITS DECODING METHOD, DEVICES FOR THESE, PROGRAM, AND ITS RECORDING MEDIUM

TECHNICAL FIELD

The present invention relates to a coding method, a decoding method, and an apparatus and program for these methods, and a recording medium on which the program is recorded that are used for recording and transmitting multichannel signals such as audio, general, and environmental signals.

BACKGROUND ART

In the conventional multichannel audio signal coding art, many studies have been made on coding that uses correlation between stereo signals to compress the amount of information. In the case of coding five channel signals which may not be audio signals, one known method is to group channel signals in pairs, like stereo signals, to reduce them to coding of stereo signals. Compressive coding based on a difference signal or a fixed-weighted difference signal between the channels is also often used which exploits similarity of signals between channels of the original sounds. However, compressive coding techniques often provide low compression efficiencies. Examples of the techniques are disclosed in Non-patent literature 1 and Non-patent literature 2.

A conventional predictive 1-channel coding and decoding method will be described with reference to FIG. 1. As shown in FIG. 1A, at the coding end, a time-series digital signal provided through an input terminal 11 is divided by a frame divider 12 into short-time periods (called frames) each consisting of a predetermined number of samples, for example 1,024 samples. The digital signal is analyzed using linear prediction, frame by frame, to calculate prediction coefficients at a linear predictive analyzing section 13. The predictive coefficients are typically quantized by a quantizer 13*a* in the linear prediction analyzing section 13.

A linear predicting section 14 uses the quantized prediction coefficients and the digital signal in the frame as inputs to perform linear prediction on the digital signal in the time direction to obtain a predicted value of each sample. The linear prediction is autoregressive forward prediction. A subtractor 15 subtracts the predicted value from the corresponding sample of the input digital signal to generate a prediction error signal. The linear prediction section 14 and the subtractor 15 constitute a prediction error generating section 16.

The prediction error signal from the prediction error generating section 16 is entropy-coded using Huffman coding or arithmetic coding in a compressive coding section 17 and the result is outputted as an error code. The quantized prediction coefficients from the linear predictive analyzing section 13 are coded using entropy coding or vector quantization in a coefficient coding section 18 and the result is outputted as a coefficient code. The prediction coefficients may be scalar-quantized and outputted.

At the decoding end, as shown in FIG. 1B, an inputted compressed code is decoded in an expansion-decoding section 21 by using a decoding scheme corresponding to the coding scheme used by the compressive coding section 17 to generate a prediction error signal. An inputted coefficient code is decoded in a coefficient decoding section 22 using a decoding scheme corresponding to the coding scheme used by the coefficient coding section 18 to generate prediction coefficients. The decoded prediction error signal and prediction coefficients are inputted into a predictive synthesizing section 23, where they are predictive-synthesized to reproduce a digital signal. A frame combiner 24 sequentially combines frames of the digital signal and outputs them through an output terminal 25. In the predictive synthesizing section 23, the digital signal to be reproduced and the decoded prediction coefficients are inputted into a regressive linear prediction section 26, where a prediction value is generated, and the prediction value and the decoded prediction error signal are added together in an adder 27 to reproduce the digital signal.

A conventional method for coding a pair of stereo signals will be described with reference to FIG. 2 in which channels in a multichannel coding is reduced to coding of each pair of stereo signals. A first-channel digital signal $x_L(k)$ and a second-channel digital signal $x_R(k)$ in one frame are inputted into predictive coding sections $\mathbf{31}_L$ and $\mathbf{31}_R$ through input terminals $\mathbf{11}_L$ and $\mathbf{11}_R$, respectively. A difference circuit 32 calculates the difference $d(k)=x_L(k)-x_R(k)$ between the two signals. The difference signal d(k) is inputted into a predictive coding section $\mathbf{31}_D$.

The predictive coding sections $\mathbf{31}_L$, $\mathbf{31}_R$, and $\mathbf{31}_D$ have the same configuration as that of the 1-channel predictive coding apparatus, for example as shown in FIG. 1A. Codes $CS_L$, $CS_R$, and $CS_D$ from the predictive coding sections $\mathbf{31}_L$, $\mathbf{31}_R$, and $\mathbf{31}_D$ are inputted into a code length comparator 33. The code length comparator 33 selects two codes with the minimum total code amount from among the pairs in the three codes and outputs them as codes for the first and second digital signals $x_L(k)$ and $x_R(k)$. Using the correlation between channels of digital signals in this way can reduce the amount of coding code.

A technique has been proposed that uses the correlation between two channel signals and generates and codes a weighted difference between the channel signals, thereby improving the efficiency of compression. An example of this technique is shown in FIG. 3. Prediction error generators $\mathbf{34}_L$ and $\mathbf{34}_R$ generate linear prediction error signals $e_L(k)$ and $e_R(k)$ from digital signals $x_L(k)$ and $x_R(k)$. The liner prediction error signals $e_L(k)$ and $e_R(k)$ are inputted into entropy coders $\mathbf{35}_L$ and $\mathbf{35}_R$ and also inputted into a weighted difference generator 36. While the linear prediction coefficients are also coded separately as in the example shown in FIG. 1A, only those parts related to the linear prediction errors are shown in FIG. 3. Supposing that a liner prediction error signal vector $E_R=(e_R(0), e_R(1), \ldots, e_R(K-1))$ is a reference signal for a liner prediction error signal vector $E_L=(e_L(0), e_L(1), \ldots, e_L(K-1))$, a weight calculating section 36*a* of a weighted difference generator 36 calculates a weighting factor β such that the energy $$EN_d=\|E_L-\beta E_R\|^2$$

of the weighted difference signal (vector) $D=(d(0), d(1), \ldots, d(K-1))$ is minimized. Here, K denotes the number of samples of each signal in one frame, and β can be calculated as follows:

$$\beta=E_R^TE_L/E_R^TE_R$$

where $E_R^TE_L$ is the inner product, which can be calculated according to the following equations.

$$E_R^TE_L=\Sigma_{k=0}^{K-1}e_R(k)e_L(k)$$

$$E_R^TE_R=\Sigma_{k=0}^{K-1}e_R(k)^2$$

The weighting factor calculated in the weight calculating section 36*a* is quantized in a factor quantizer 36*d* and the resulting weighting factor code q is outputted to a code length comparator 37. The quantized weighting factor is inverse-quantized in an factor inverse quantizer 36*e* and the linear prediction error signal $e_R(k)$ is multiplied by the resulting weighting factor $\beta(q)$ at a multiplier 36*b*. The product is subtracted from the liner prediction error signal $e_L(k)$ in a subtractor 36*c* to generate a weighted difference signal d(k). The weighted difference signal d(k) is inputted into an entropy coder $\mathbf{35}_D$. Codes $CS_L$ and $CS_D$ from the entropy coders $\mathbf{35}_L$ and $\mathbf{35}_D$ are inputted in the code length comparator 37 and one of the codes that has a smaller code amount is outputted. The output from the code length comparator 37 and the output from the entropy coder $\mathbf{35}_R$ are the coded outputs of the digital signals $x_L(k)$ and $x_R(k)$. The code length comparator 37 also codes the weighting factor β and adds it to the outputs. In this way, the signals can be compressed more efficiently than by the coding shown in FIG. 2.

Non-patent literature 1: "An introduction to Super Audio CD and DVD-Audio", IEEE SIGNAL PROCESSING MAGAZINE, July 2003, pp. 71-82

Non-patent literature 2: M. Hans and R. W. Schafer, "Lossless Compression of Digital Audio", IEEE Signal Processing Magazine, vol. 18, no. 4, pp. 21-32, 2001

DISCLOSURE OF THE INVENTION

Problem to be Solved by the Invention

For example, frame-divided first to sixth channel signal vectors $X_1$-$X_6$ are grouped and coded in three pairs of stereo signals: the pair of the first and second channel signal vectors ($X_1$, $X_2$), the pair of the third and fourth channel signal vectors ($X_3$, $X_4$), and the pair of the fifth and sixth channel signal vectors ($X_5$, $X_6$). If the order K of each vector is 2, the signal vectors $X_1$-$X_6$ can be represented on a two-dimensional coordinate diagram with orthogonal coordinate axes representing the zero-order element x(0) and the first-order element x(1) of the vectors, as shown in FIG. 4A.

The zero-order element $d_{1,2}(\mathbf{0})$ and the first-order element $d_{1,2}(\mathbf{1})$ of the difference signal vector between vectors $X_1$ and $X_2$ are $x_1(\mathbf{0})$-$x_2(\mathbf{0})$ and $x_1(\mathbf{1})$-$x_2(\mathbf{1})$, respectively. In this case, the difference signal vector has a large amplitude. Therefore, it is preferable that $X_1$ and $X_2$ be directly coded. Likewise, it is preferable that the pair of vectors $X_3$ and $X_4$ be directly coded. The amplitude of the difference signal vector $d_{5,6}$ of the pair of vectors $X_5$ and $X_6$ is small. Therefore, the pair of vector $X_5$ and the difference signal vector $d_{5,6}$ may be coded. However, high compression rates are not necessarily achieved by generating and coding difference signal in this way.

On the other hand, consider a method in which the first to sixth channel signals are reduced to two pairs of stereo signals and the stereo signals are coded using the coding shown in FIG. 3. Because a weighting factor β is determined such that the energy value obtained by subtracting the one of each pair of vectors from the other vector multiplied by a weighting factor β (here, it is assumed that β>0, because of the constraints of the drawing) is minimized, the weighted difference between them is the difference vector that is the perpendicular line drawn from one vector to the other (the reference signal) vector. The perpendicular line is often smaller that of the former vector. Therefore, the perpendicular line and the reference signal may simply be coded.

It is assumed here that the prediction error signal vectors of the first to sixth channels are vectors $E_1$-$E_6$ whose order K is 2 and are the same as those vectors $X_1$-$X_6$, respectively, shown in FIG. 4A. FIG. 4B shows the vectors $E_1$-$E_6$ on a two-dimensional coordinate diagram with orthogonal coordinate axes representing the zero-order element e(0) and the first-order element e(1) of the vectors. The weighting factor β is greater than or equal to 0. The weighted difference signal (vector) $d_{1,2}$ with the vector $E_2$ as a reference signal of the vector $E_1$ represents the perpendicular line drawn from vector $E_1$ to vector $E_2$ as shown in FIG. 4B. The weighted difference vector $d_{1,2}$ is smaller than vector $E_1$. Likewise, the weighted difference vector $d_{5,6}$ of the vectors $E_5$ and $E_6$ is smaller than vector $E_5$. However, vectors $E_3$ and $E_4$ are opposite in direction to each other, therefore the weighted difference is even greater. For the pair of vectors $E_3$ and $E_4$, therefore, it is preferable that vectors $E_3$ and $E_4$ be directly coded, rather than coding the weighted difference vector. In this way, the method can increase the compression rate by generating weighted difference signals, compared with the method shown in FIG. 2 in which difference signals without weights are generated. However, the method has the problem that there are pairs, such as the pair of vectors $E_3$ and $E_4$, the compression rate of which cannot be increased by using the weighted difference signal.

Means to Solve Issues

According to the coding method of the present invention, determination is made for each channel of multichannel (two or more channels) signals in a multistage coding process as to which channel signal is used as a reference signal (hereinafter referred to as a "parent" or "master") for weighted difference coding. In doing so, for at least one channel signal, a weighting factor of 0 is used for its reference signal (therefore the one channel signal itself is considered as the parent of itself). The multistage coding process described above is repeated at least once for the weighted difference signals determined in the first stage of the multistage coding process. Then, the weighted difference signals corresponding to the end results of the process is compressive-coded and the weighting factor of each channel resulting from each iteration of the multistage coding process is coded and outputted.

According to the decoding method of the present invention, an input multichannel coded code is separated channel by channel and a reference signal (hereinafter also referred to as a "parent" or "master") and a weighting factor determined on the basis of an auxiliary code of each channel are used to perform weighted addition to generate a decoded waveform signal. In doing this, at least one channel code is considered as the parent of itself in accordance with its auxiliary code and the decoded waveform signal of that channel is outputted as the decoded waveform signal obtained by the addition. The decoding method of the present invention includes at least one iteration of the process described above.

EFFECTS OF THE INVENTION

According to the coding method of the present invention, weighted difference signals are generated from a multichannel signal and weighted difference signals are further generated from those generated weighted difference signals. This process is repeated at least once. Consequently, the final weighted difference signals have smaller amplitudes and thus a greater compression rate can be achieved. Further, the weighted difference signals include weighted difference signals with a weighting factor of 0, that is, channel signals themselves. Therefore, signal vector $E_4$ for example becomes weighted difference signal $d_{4,56}$ with difference signal $d_{5,6}$ as the reference signal as shown in FIG. 4B. Thus, the compression rate is further improved.

According to the decoding method of the present invention, a multichannel signal coding code generated by the coding method of the present invention can be decoded by performing weighted addition by reusing additive-decoded waveform signals as parents.

BRIEF DESCRIPTION OF THE DRAWINGS

FIG. 9A shows an exemplary auxiliary code obtained as a result of one iteration of a coding determining process for six channels;

FIG. 9B shows a second example representing a method for generating a single code;

FIG. 9C shows a third example representing a method for generating a single code;

BEST MODES FOR CARRYING OUT THE INVENTION

Figure 1A:
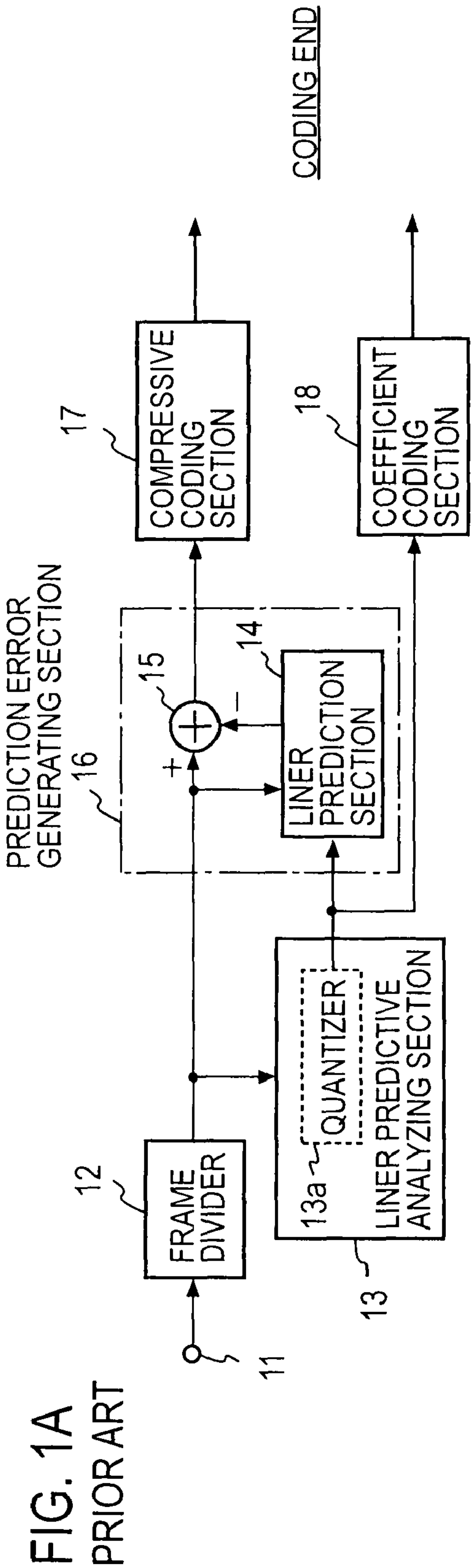
FIG. 1A PRIOR ART
FIG. 1A shows a functional configuration of a conventional 1-channel predictive coding.
Figure 1B:
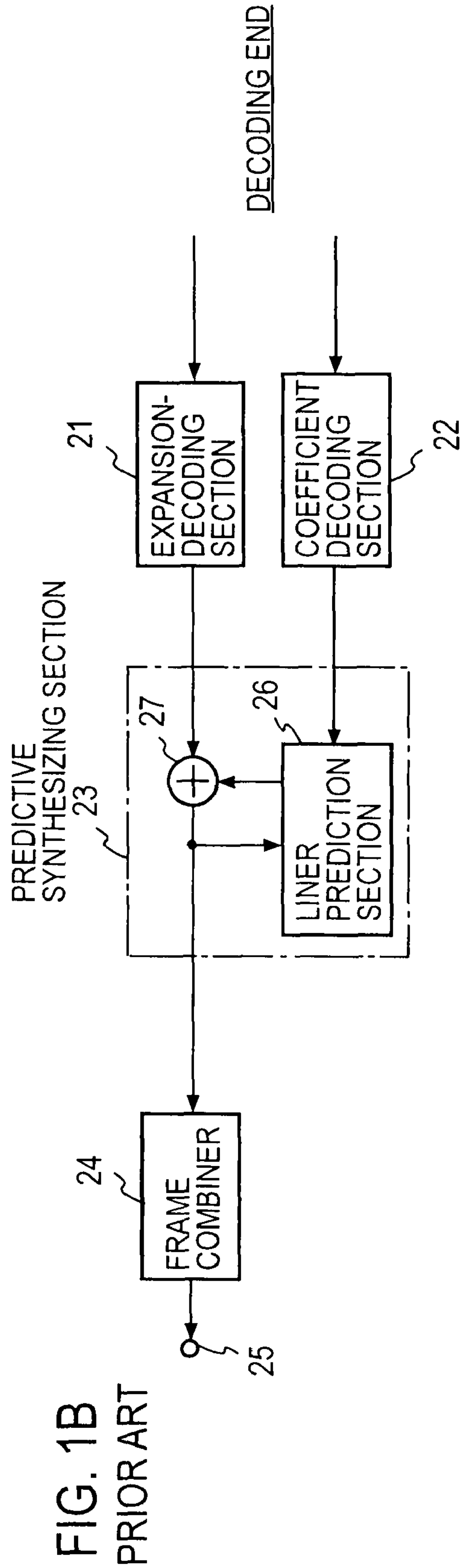
FIG. 1B PRIOR ART
FIG. 1B shows a functional configuration of a conventional decoding apparatus for decoding 1-channel predictive coded codes.

Embodiments of the present invention will be described with reference to the accompanying drawings. Throughout the drawings, like elements are labeled like reference numerals to avoid overlapping descriptions.

First Embodiment

Figure 5:
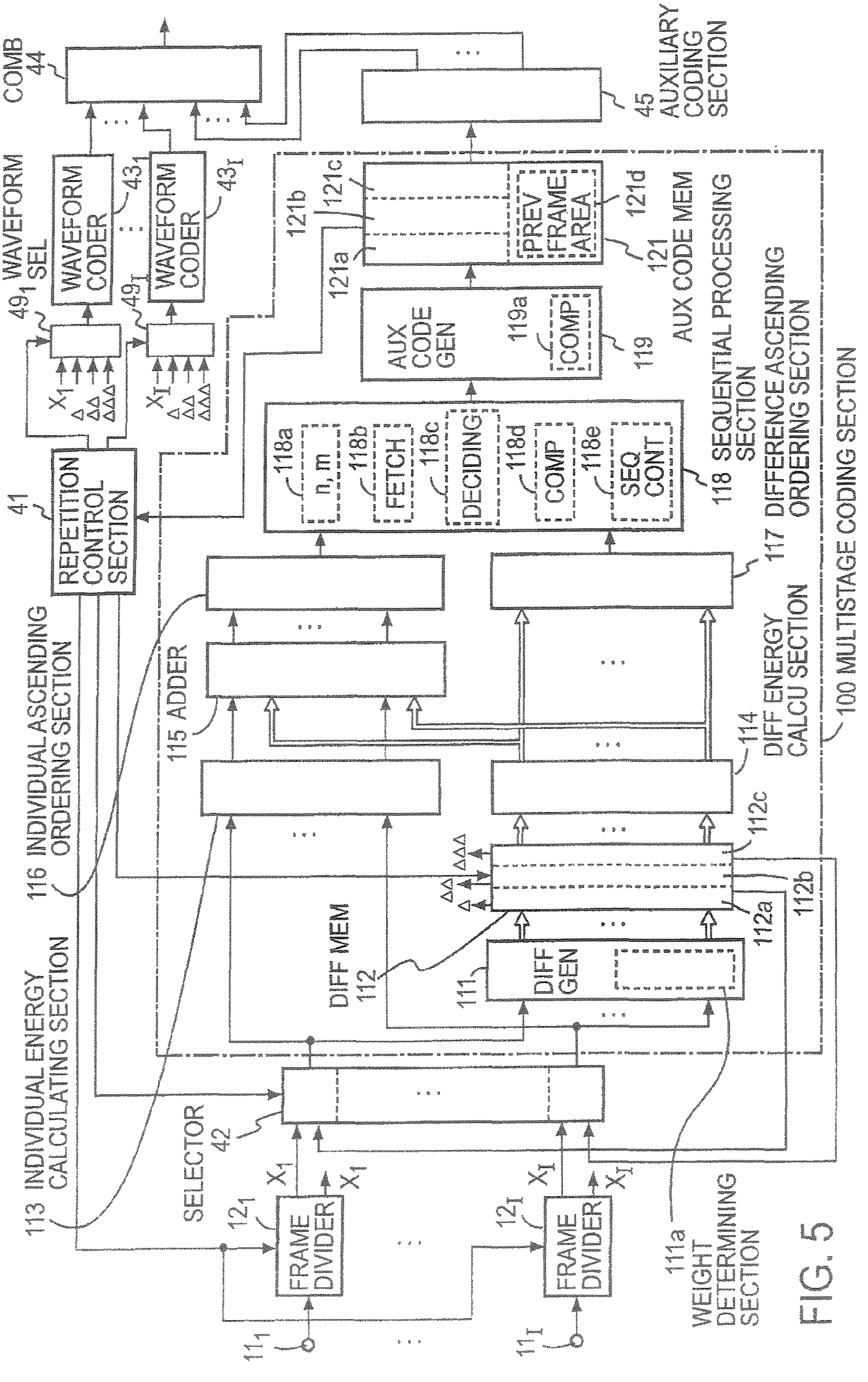
FIG. 5 shows an exemplary functional configuration of a coding apparatus according to the present invention.
Figure 6:
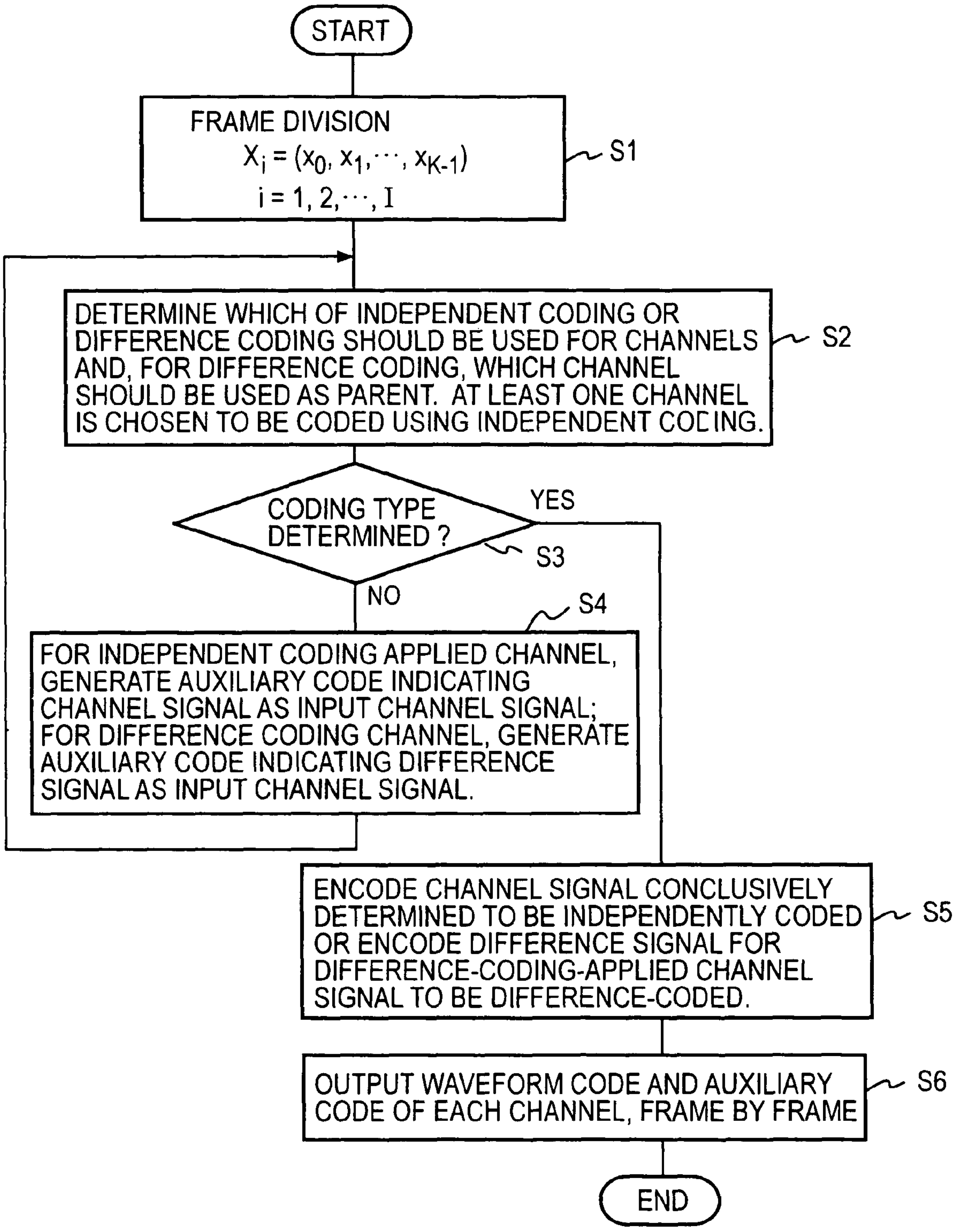
FIG. 6 shows a process of a coding method according to the present invention.

A coding method according to the present invention will be described with respect to a first embodiment. FIG. 5 shows an exemplary functional configuration of a coding apparatus according to the present invention and FIG. 6 shows a process performed in the coding apparatus.

Each of input signals of first to I-th channels (hereinafter sometimes referred to as "channel signals") inputted through input terminals $\mathbf{11}_1$-$\mathbf{11}_I$ is divided into short time periods (frames) each consisting of 256, 1,024, or 8,192 samples, for example, in a frame divider $\mathbf{12}_1$-$\mathbf{12}_I$ (step S1). Here, I is an integer greater than or equal to 2. Typically, the channel signals are digital signals. In each frame, determination is made in a multistage coding section 100 as to whether each of the first to I-th channel signals should be subjected to independent coding or weighted difference coding using one of the channel signals as a reference signal (hereinafter sometimes referred to as a "parent" or "master") (step S2). In this determination, at least one channel signal is chosen to be coded by independent coding. The term independent coding as used herein refers to coding of a channel signal by itself. The independent coding can be considered as coding using the channel signal itself as its parent or can be considered as weighted difference coding with a weighting factor of 0. Accordingly, the term weighted difference coding as used herein may sometimes refer to independent coding as well. In that case, the wording "at least one channel signal is coded by independent coding" means that 0 is chosen as the weighting factor for at least one.

On the basis of the energies of weighted difference signals, determination is sequentially made as to which of independent coding or weighted difference coding should be applied to a channel signal, in other words, determination is made as to whether a weighting factor of 0 should be used in weighted difference coding or a non-zero weighting factor should be used with another channel signal as a parent in weighted difference coding, in order to minimize the energy of the weighted difference signals of all channels, that is, to minimize the overall code amount generated by the coding.

Figure 3:
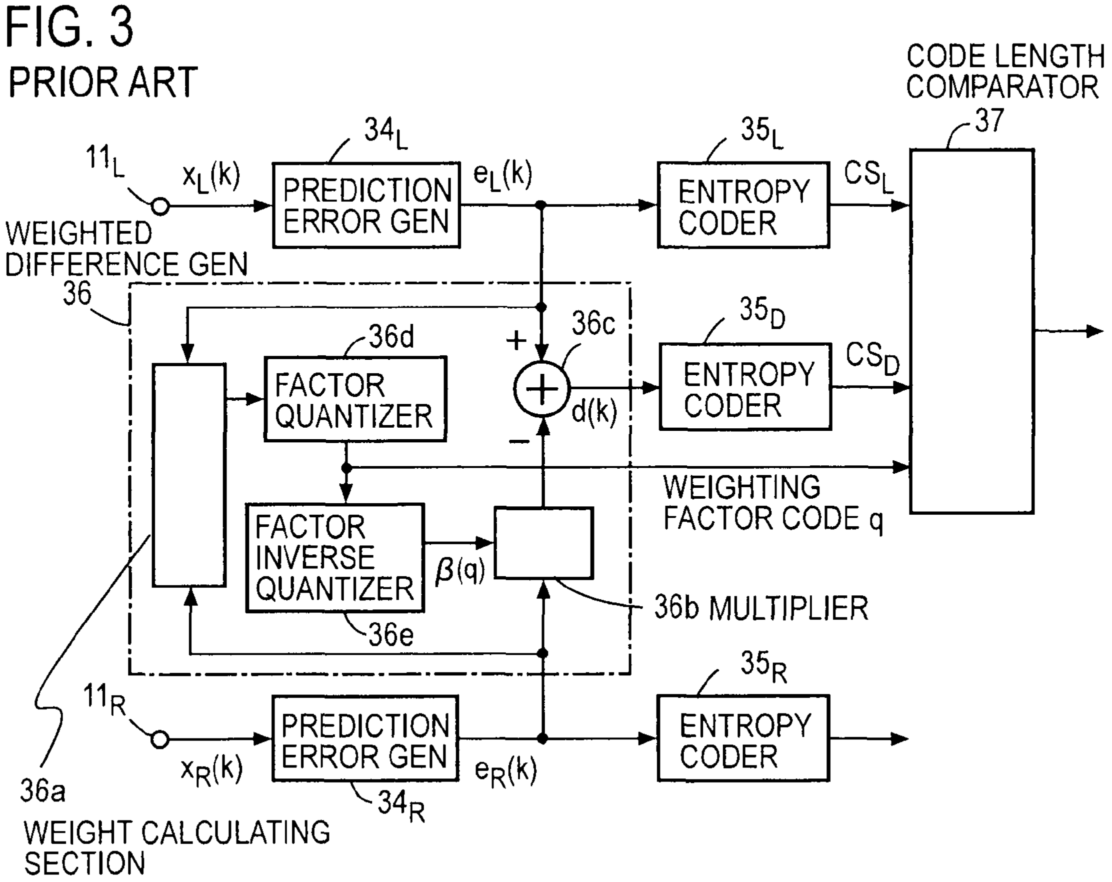
FIG. 3 PRIOR ART
FIG. 3 shows a functional configuration of a coding apparatus that can be devised based on a conventional stereo signal coding apparatus.
Figure 7A:
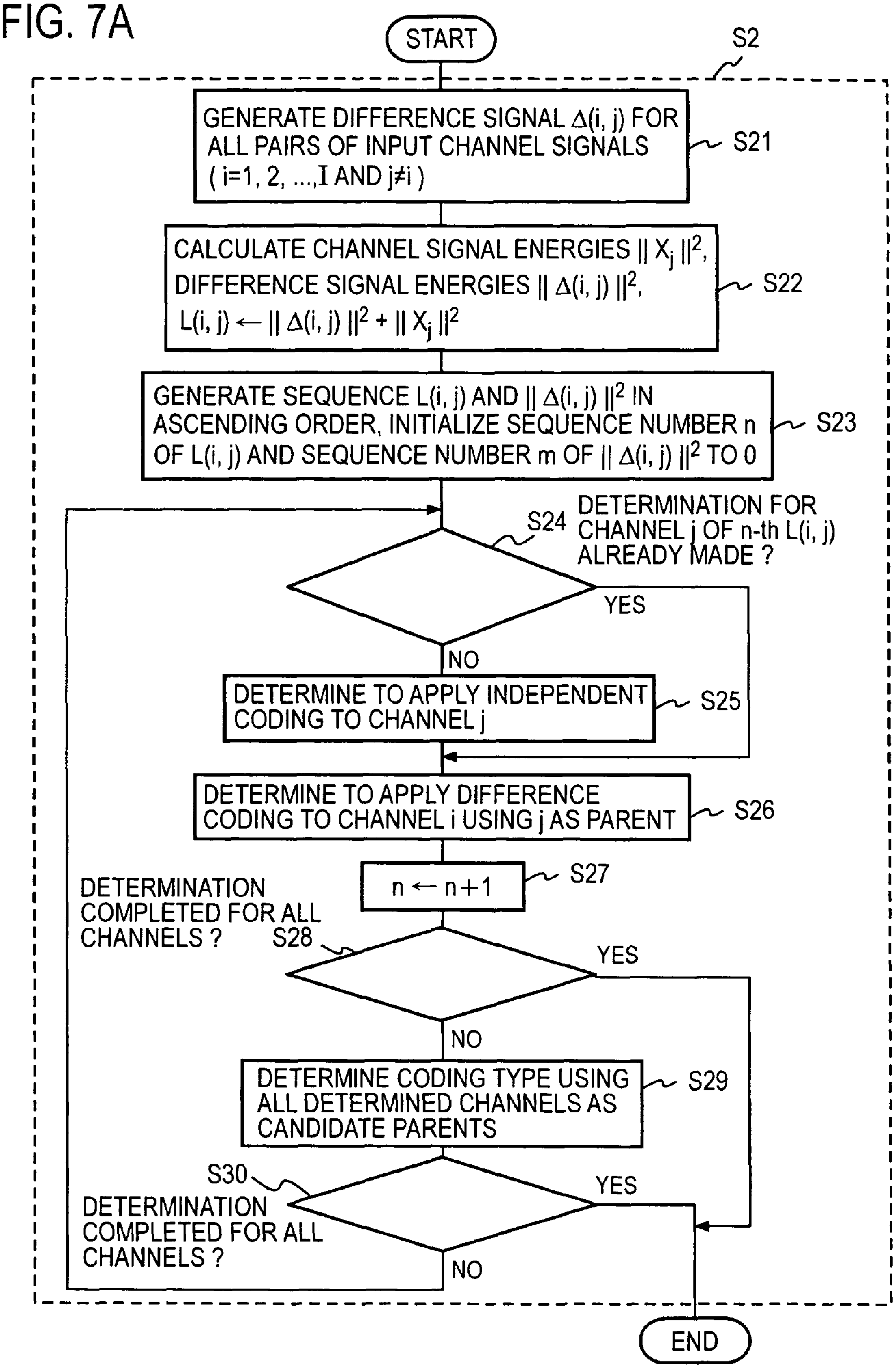
FIG. 7A shows an example of specific operation at step S2 in FIG. 6.

This sequential determination is performed in the multi-stage coding section 100 having a functional configuration as shown in FIG. 5, for example, by following the process shown in FIG. 7A. The first to I-th channel signals $X_1$-$X_I$ are inputted into a difference generating section 111. The difference generating section 111 generates weighted difference signals Δ(i, j) for all possible pairs of the channel signals (step S21). The signal Δ(i, j) represents a weighted difference signal of signal $X_i$ from its parent signal, signal $X_j$. Because all difference signals used in the present invention are weighted difference signals, a weighted difference signal Δ(i, j) is sometimes simply called a difference signal Δ(i, j) in the following description. In the difference generating section 111, a weight determining section 111*a* calculates a weighting factor W(i, j) for the weighted difference signal Δ(i, j). The weighting factor can be calculated with the same calculation performed in the weight calculating section 36*a* in FIG. 3. The difference signals Δ(i, j) and their weighting factors W(i, j) are temporarily stored in a difference memory 112.

An individual energy calculating section 113 calculates the energy $\|X_i\|^2$ of each of the first to I-th channel signals $X_1$-$X_I$. A difference energy calculating section 114 calculates the energies $\|\Delta(i, j)\|^2$ of all weighted difference signals Δ(i, j) (i≠j). Further, an adder 115 adds each difference energy $\|\Delta(i, j)\|^2$ to the energy of its parent channel signal $\|X_j\|^2$ to obtain the sum energy L(i, j) (step S22). Namely, $\|\Delta(i, j)\|^2+\|X_j\|^2=L(i, j)$. The sum energies L(i, j) are sequenced in ascending order in an individual energy ascending ordering section 116 and the difference energies $\|\Delta(i, j)\|^2$ are sequenced in ascending order in a difference energy ascending ordering section 117. The respective (i, j) are associated with the ordered energies and held with them. A sequence number of the sum energy L(i, j) is denoted by n (where n=0, 1, . . . ) and a sequence number of the difference energy $\|\Delta(i, j)\|^2$ is denoted by m (where m=0, 1, . . . ). The sequence number parameters n and m in a register 118*a* in a sequential processing section 118 are set to 0 (step S23). A fetching section 118*b* fetches a channel identification number i (hereinafter distinctively referred to as the "child channel identification number i" for easy distinction from the parent channel) and the corresponding parent channel identification number j corresponding to the n-th smallest one of the sum energies L(i, j) from the individual energy ascending ordering section 116. A deciding section 118*c* decides whether the type of coding to be applied to the channel signal $X_j$ of the parent channel j has already been determined (step S24). If it is decided at step S24 that the type of coding to be applied to the channel j has not yet been determined, independent coding (difference coding with a weighting factor of 0) is chosen for the channel signal $X_j$ of the channel j (step S25) and difference coding using the channel signal $X_j$ as parent is chosen for the channel signal $X_i$ of the channel j's child channel (step S26).

If it is decided at step S24 that the type of coding has already been determined, the process proceeds to step S26, where it is determined that the channel signal $X_i$ of the child channel i is to be coded by difference coding using the signal $X_j$ of the channel j as parent. After step S26, "n" is incremented by 1 (step S27), and decision is made by the deciding section 118*c* as to whether the type of coding for all channel signals $X_1$-$X_I$ have been determined (step S28). If not, a channel signal is determined for which difference coding is to be applied using a channel signal for which a coding type has already been determined as a candidate parent (step S29).

Figure 8:
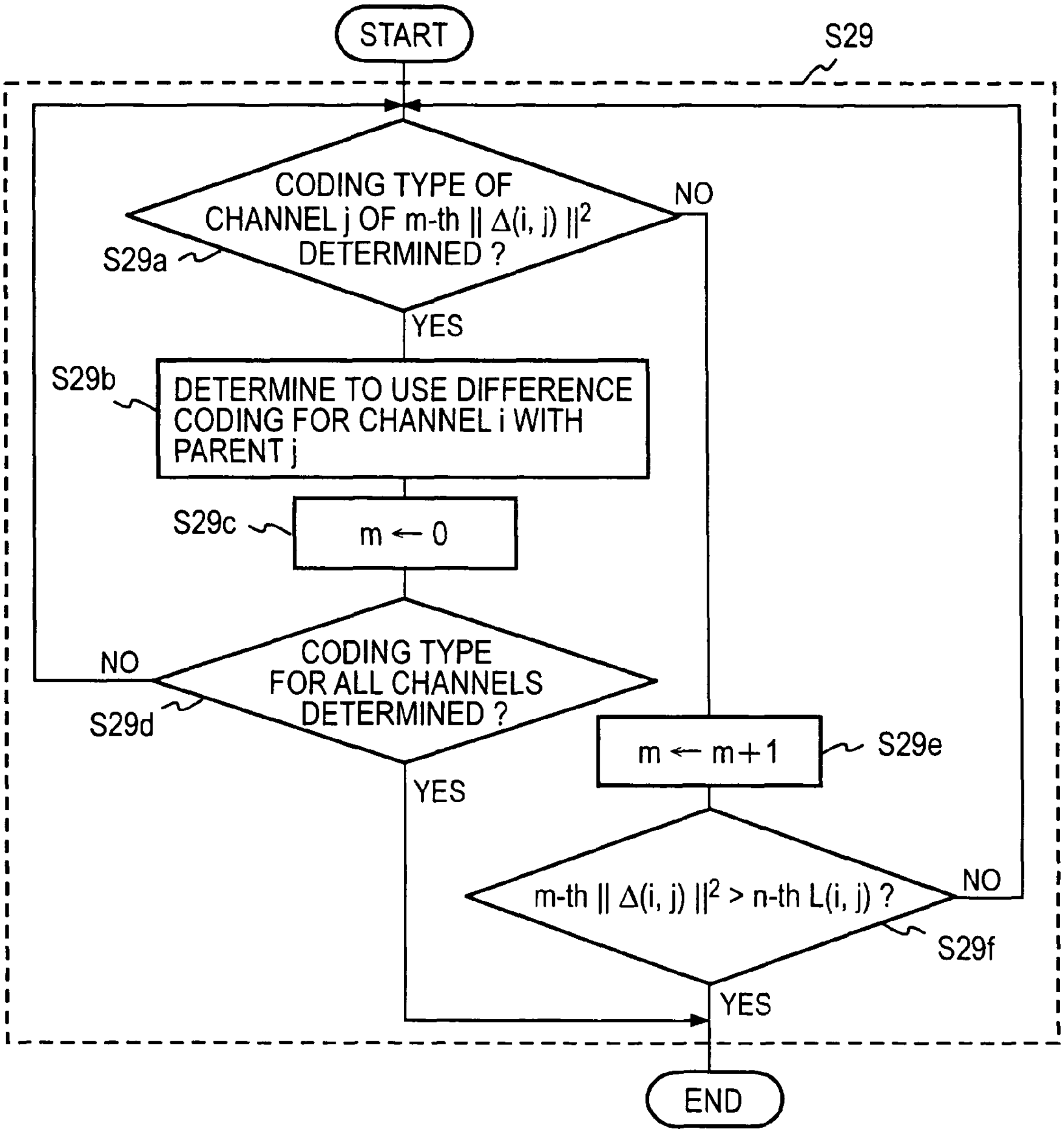
FIG. 8 shows an example of specific operation at step S29 in FIG. 7A.

Processing at step S29 may be performed as shown in FIG. 8. First, the m-th difference energy $\|\Delta(i, j)\|^2$ and its parent channel identification number j are fetched by the fetching section 118*b* from the difference ascending ordering section 117 and decision is made in the deciding section 118*c* as to whether the type of coding to be applied to the channel signal of its parent channel j has been determined (step S29*a*). If decision at step S29*a* is Yes, then it is determined that the channel signal of the channel i is to be coded by difference coding with the channel signal of the channel j as parent (step S29*b*). Then, m is initialized to 0 (step S29*c*). Decision is then made by the deciding section 118*c* as to whether coding types have been determined for all channel signals $X_i$-$X_j$. If not, the process returns to step S29*a*; otherwise the process at step S29 will end (step S29*d*).

Figure 4B:
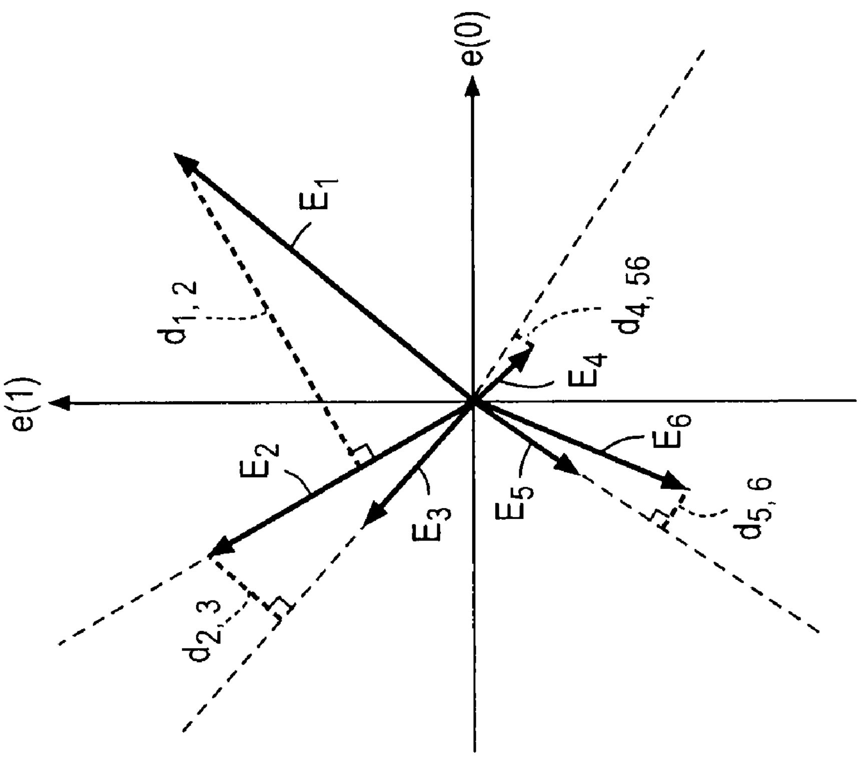
FIG. 4B PRIOR ART
FIG. 4B is a diagram for explaining weighted difference coding using vectors.
Figure 4A:
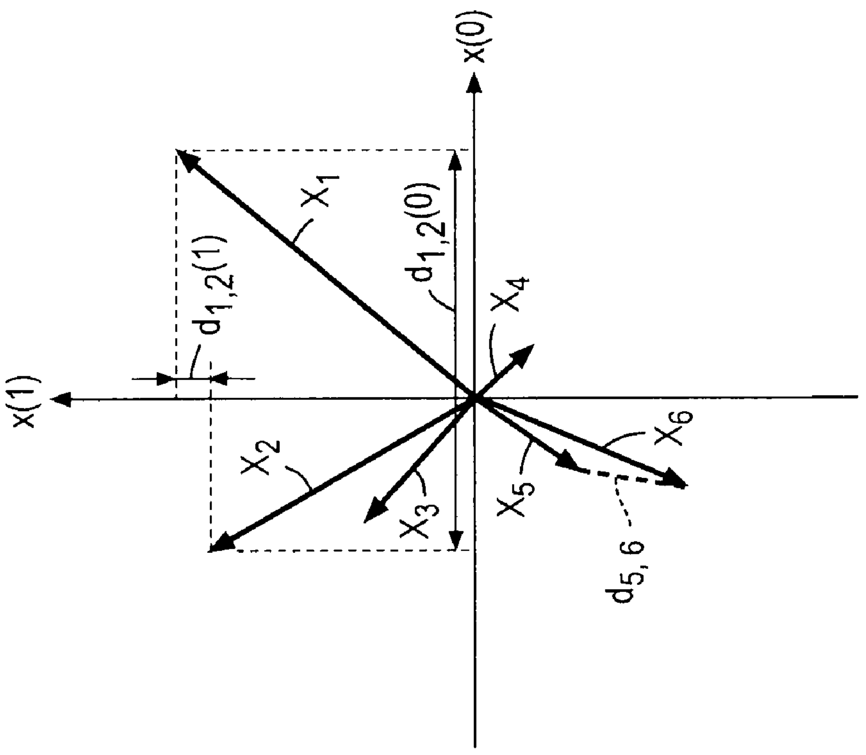
FIG. 4A PRIOR ART
FIG. 4A is a diagram for explaining difference coding using vectors.

If decision at step S29*a* is No, m is incremented by 1 (step S29*e*). Then, the n-th smallest sum energy L(i, j) and the m-th smallest difference energy $\|\Delta(i,j)\|^2$ are fetched by the fetching section 118*b* from the individual energy ascending ordering section 116 and the difference ascending ordering section 117, and L(i, j) is compared with $\|\Delta(i,j)\|^2$ at a comparator 118*d* to decide whether L(i, j) is greater (step S29*f*). If $L(i, j)\leqq\|\Delta(i,j)\|^2$, the process returns to step S29*a*; if $L(i, j)>\|\Delta(i, j)\|^2$, step S29 will end and the process proceeds to step S30 in FIG. 7A. Because m is initialized to 0 at step S29*c*, check will be sequentially made as to whether a channel signal can be coded by difference coding using as parent a channel signal that has been determined at step S29 to be coded by difference coding. That is, according to the present invention, coding that uses a weighted difference signal as parent (reference signal) is performed, which has not been performed in conventional weighted difference coding. As a result, greater compression rates can be achieved as compared with the conventional art. Furthermore, when comparison based on FIGS. 4A and 4B is made with the method in which the first to I-th channel signals are sequentially grouped in pairs and the pairs are coded, channel signal $X_2$ is coded by independent coding or difference coding using channel signal $X_1$ as parent in the conventional method whereas, according to the present invention, channel signal $E_2$ becomes difference signal $d_{2,3}$ with respect to the parent signal, channel signal $E_3$. Therefore, a greater compression rate can be achieved.

Returning to FIG. 7A, at step S30, the deciding section 118*c* decides as to whether the type of coding has been determined for all channel signals $X_1$-$X_I$. If there remains a channel signal for which the type of coding has not yet been determined, the process returns to step S24; otherwise, step S2 will end. In the sequential processing section 118 in FIG. 5, update and initialization of the parameters n and m, fetching of (i,j), L(i, j), and $\|\Delta(i, j)\|^2$ by the fetching section 118*b* from the ascending ordering sections 116 and 117, decision at the deciding section 118*c*, and comparison at the comparator 118*d* are performed sequentially in accordance with instructions from a sequence control section 118*e*.

Figure 7B:
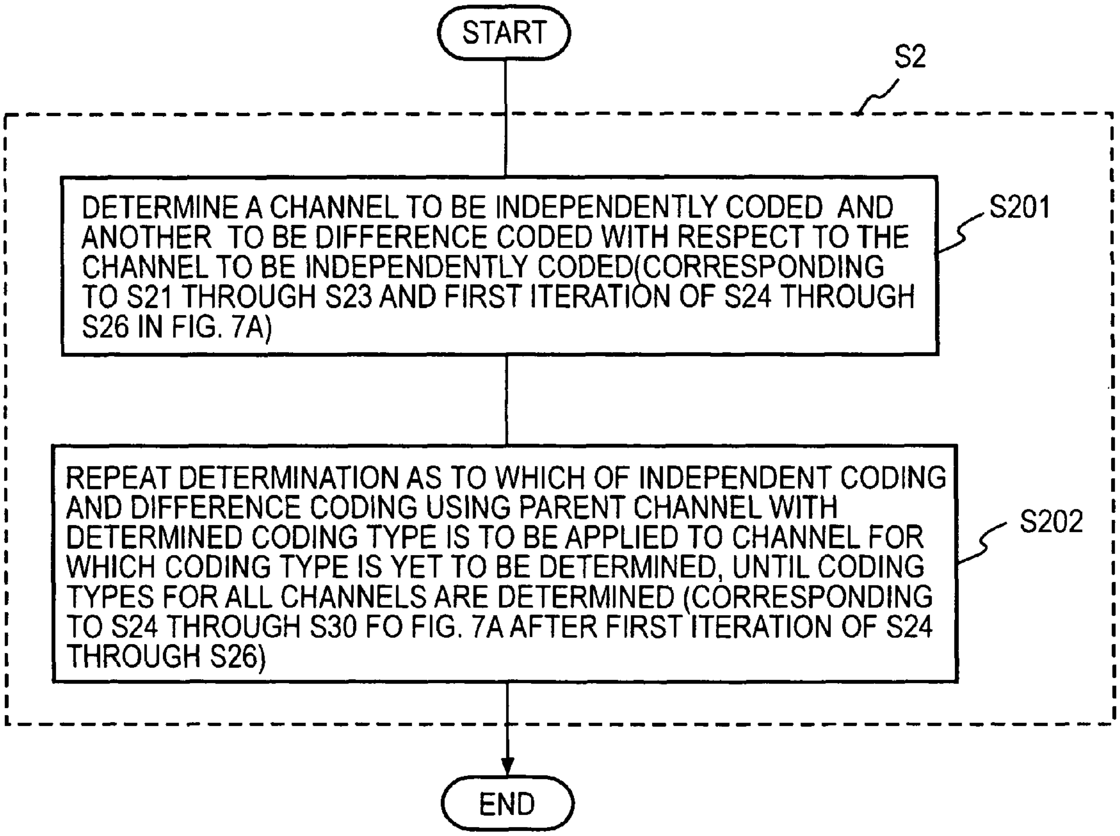
FIG. 7B is another flow of the process shown in FIG. 7A.
Figure 7C:
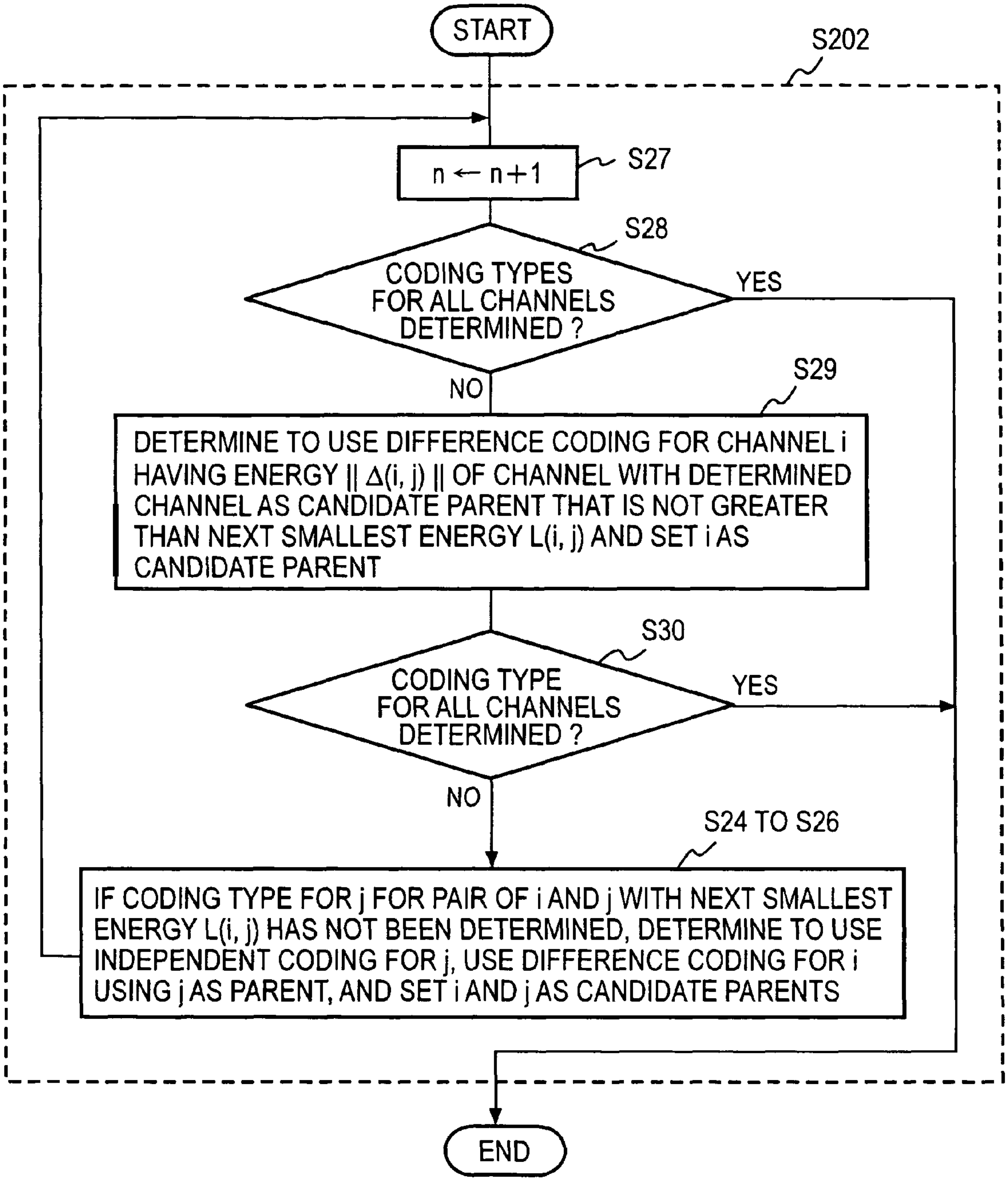
FIG. 7C is a diagram showing that the process shown in FIG. 7B is equivalent to the process shown in FIG. 7A.

The processing at step S2 in FIG. 7A can also be represented as shown in FIG. 7B. Step S201 of FIG. 7B corresponds to steps S21 through S23 in FIG. 7A and the first iteration of the process from step S24 and S26. Step S202 corresponds to the first iteration of the iterative process (steps S24 through S30) starting at step S27. FIG. 7C shows details of step S202. It can be seen that step S202 is the first iteration of the iterative process (steps S24 through S30) starting at step S27 in FIG. 7A.

In this way, the type of coding to be used for each channel signal is determined and various items of information indicating the determination are generated in auxiliary code generating section 119 in FIG. 5. An exemplary auxiliary code is shown in FIG. 9A. The auxiliary code is of the first to sixth channel signals $X_1$-$X_6$. An end flag $F_{EN}$, a flag $F_R$ indicting whether the parent is the same as that in the previous frame, a parent channel identification number j, a weighting factor W(i, j), and an end flag $F_{EN}$ are arranged in an auxiliary code CAi associated with each channel identification number i (where i=1, . . . , 6). A "1" in the end flag $F_{EN}$ indicates the end of the auxiliary code CAi of a channel. A "1" in the flag $F_R$ indicating whether the parent is the same as that in the previous frame indicates that the parent channel identification number j is the same as the parent channel identification number j in the auxiliary code CAi of that channel i in the previous frame. A comparator 119*a* compares the parent channel identification number j of the current frame with its corresponding parent channel identification number j contained in a previous-frame area 121*d* in an auxiliary code memory 121, which will be described later. If they match, 1 is set in $F_R$ and the succeeding parent channel identification number j will be omitted and $F_R$ will be immediately followed by the weighting. The parent channel j represents the channel identification number of the parent channel signal used in difference coding and the weighting factor W(i, j) represents the weighting factor used for the difference coding. It should be noted that the flag $F_R$ indicating whether the parent is the same as that in the previous frame can be omitted.

FIGS. 9A, 9B, and 9C show exemplary auxiliary codes. In the example in FIG. 9A, a "0" is set in the flag $F_{EN}$ at the left-most position of the auxiliary code CA1 of the first channel, indicating that it is followed by additional information, as shown on the right. Accordingly, a weighting factor W(i, j) for the difference signal Δ(i, j) is retrieved from the difference memory 112. The auxiliary code follows as shown in the right-hand part of FIG. 9A, in which $F_R$=0 indicates that the parent channel identification number j differs from that of the first channel in the previous frame. It can be seen from j=2 and W(1, 2) that the parent is the second channel signal and the weighting factor is 13. The auxiliary code CA1 ends with the next $F_{EN}$=1. In the auxiliary code CA3 of the third channel, a "1" is set in the end flag $F_{EN}$ at the beginning and there are not a parent channel identification number j and weighting factor W(i, j), indicating independent coding. As stated earlier, independent coding can also be considered as weighted difference coding. For example, the auxiliary code CA3 of the third channel is as shown in FIG. 9B. In particular, the end flag $F_{EN}$=0, the flag indicating whether the parent is the same as in the previous frame $F_R$=0, the parent channel identification number j=3, the weighting factor W(3,3)=0, and the end flag $F_{EN}$=1 are in CA3. As shown in FIG. 9C, an end flag $F_{EN}$=1 may be provided next to the parent channel identification number j=3.

Returning to FIGS. 5 and 6, the auxiliary code CA thus generated is stored in the auxiliary code memory 121. Stored in the previous-frame area 121*d* in the auxiliary code memory 121 is at least the parent channel identification number j in the auxiliary code of the previous frame in association with each channel identification number.

In coding according to the present invention, the type of coding used for a signal of a channel (hereinafter sometimes simply referred to as "used for a channel") is determined and an auxiliary code CA is generated as described above. Then, a signal of a channel to be coded using independent coding is set as the input signal of that channel and inputted in the multistage coding section 100. For a channel to be coded using difference coding, its difference signal Δ(i, j) is set as the input signal of that channel and inputted into the multistage coding section 100. Furthermore, the process for determining the type of coding for an input signal of each channel and generating an auxiliary code is repeated at least once in the multistage coding section 100.

In particular, after step S2 (FIG. 6), an repetition control section 41 checks whether the coding type determining step for each channel has been completed (step S3). Whether the coding type determining process has been completed can be decided as follows. The coding type determining process can be terminated after a predetermined number of iterations are performed or when the reduction or reduction rate of the total difference signal energy drops to a predetermined value. If it is determined at step S3 that the coding type determining process has not yet been completed, an input channel signal to be coded using independent coding is inputted again and, for a channel signal for which difference coding is chosen, its difference signal Δ(i, j) is treated as the input channel signal of the i-th channel and an auxiliary code CA is generated (step S4). Then the process returns to step S2.

For example, if the next end flag $F_{EN}$ of the auxiliary code CAi of a channel in the auxiliary code memory 121 is 0, as shown in FIG. 5, then its corresponding difference signal Δ(i, j) in the difference memory 112 is selected by the selector 42 and is inputted into the multistage coding section 100; if the end flag $F_{EN}$ is 1, its corresponding input channel signal $X_i$ is selected by the selector 42 and inputted in the multistage coding section 100. This process is repeated under the control of the repetition control section 41.

All difference signals Δ(i, j) generated are inputted in memory area 112*a* in the difference memory 112 after the first iteration (the first step) of the coding type determining process, in memory area 112*b* after the second iteration (the second step), in memory area 112*c* after the third iteration (the third step), and so on. Likewise, auxiliary codes CA generated are stored in memory area 121*a* in the memory 121 after the first iteration of the coding type determining process, in memory area 121*b* after the second iteration, in memory area 121*c* after the third iteration, and so on.

When it is determined at step S3 that coding type determining process has been completed, waveform selector $\mathbf{49}_1$-$\mathbf{49}_I$ select input channel signals resulting from the final coding type determining process if the final coding determined is independent coding, or difference signals resulting from the final coding type determining process if the final coding determined is difference coding. Then, the signals are coded by reversible compressive coding such as entropy coding in waveform coders 43*i* (where i=1, 2, . . . , I) associated with the channels (step S5). A combiner 44 combines the waveform codes CS1-CSI from the waveform coders $\mathbf{43}_1$-$\mathbf{43}_I$ with the auxiliary codes CA1-CAI from the auxiliary coding section 45 to output a multichannel coded code (step S6).

Figure 10A:
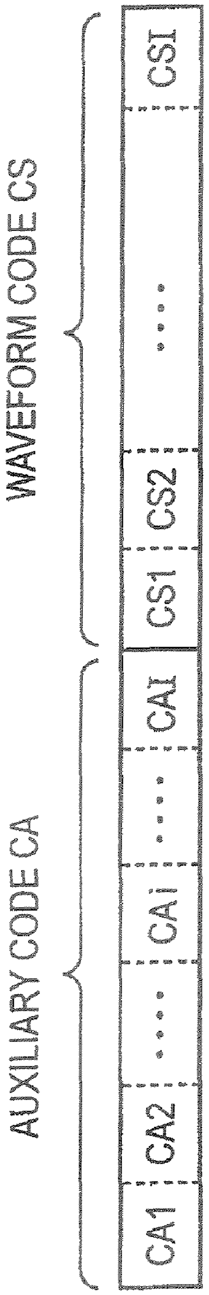
FIG. 10A shows an exemplary multichannel code.
Figure 10B:
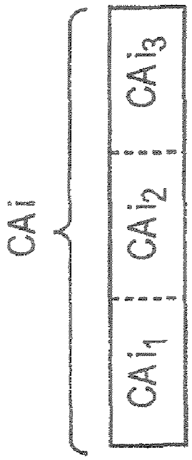
FIG. 10B shows an exemplary auxiliary code of an channel i.
Figure 10C:
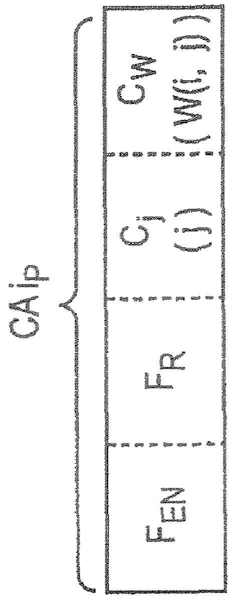
FIG. 10C shows a code generated by the p-th iteration of coding.

FIG. 10A shows an exemplary multichannel coded code. Auxiliary codes CA1-CAI of the first to I-th channels are arranged in order, followed by waveform codes CS1-CSI of the first to I-th channels arranged in order. The auxiliary codes CAi of the i-th channel are sequenced as shown in FIG. 10B: the auxiliary code generated as a result of the first iteration (first step coding type determination) is positioned as the first code $CAi_1$, the auxiliary code generated as a result of the second iteration (second step coding type determination) is positioned as the second code $CAi_2$, and the auxiliary code generated as a result of the third iteration (third step coding type determination) is positioned as the third code $CAi_3$. An end flag $F_{EN}$, a flag $F_R$ indicating whether parent is the same as that of the previous frame, a code $C_j$ indicating the parent channel identification number j, and a code $C_W$ representing a weighting factor W(i, j) are arranged in each of the codes $CAi_p$ (where p=1, 2, 3) generated in each iteration, as shown in FIG. 10C. Step S2 of this process is most preferably performed by using the method shown in FIG. 7A or 7B. However, any method may be used that chooses at least one channel signal to be coded using independent coding and uses difference coding for the other channels.

Figure 11:
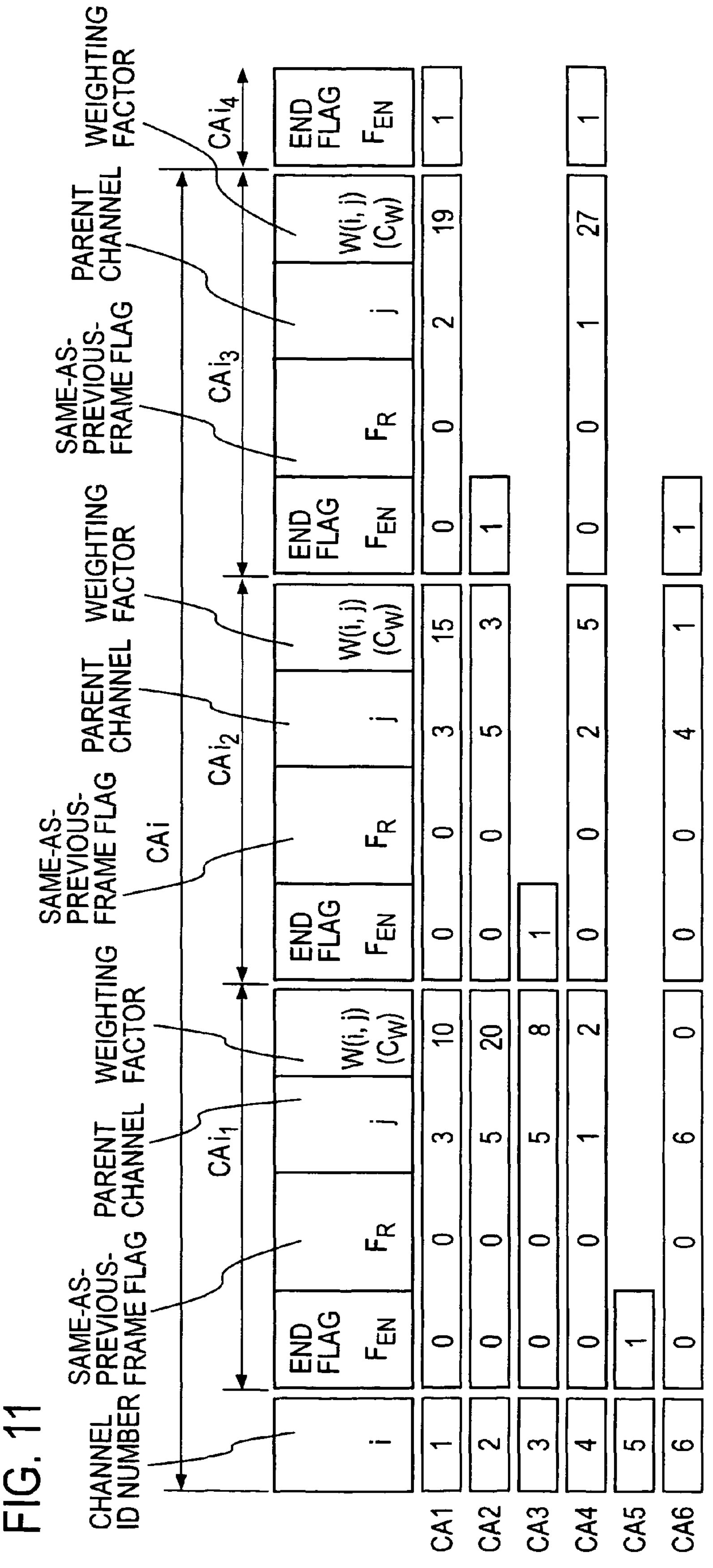
FIG. 11 shows exemplary auxiliary codes obtained in each stage of a three-stage coding determining process.

FIG. 11 shows an detailed example including specific values in auxiliary codes CAi. The numeric value contained in the weighting factor W(i, j) ($C_W$) is a code $C_W$ representing a weighting factor. The auxiliary codes CA1-CA6 of the first to sixth channels are shown in parallel. In the example shown in FIG. 10A, these code CA1-CA6 are arranged in series. In the code $CAi_1$ generated by the first iteration, only the fifth channel has the end flag $F_{EN}$ set to 1 which indicates that independent coding is applied to the fifth channel, the first to fourth channels have a parent channel identification number j and weighting factor W(i, j) that are finite values, indicating that difference coding is used for these channels. The parent channel of the sixth channel is 6 and therefore difference coding is not used for the sixth channel but instead independent coding is applied to it, and the auxiliary code of the sixth channel has not yet been completed. While a "0" is contained in the weighting factor code of the sixth channel, the weighting factor code can be omitted because independent coding does not require a weighting factor code. The code $CAi_2$ generated by the second iteration indicates that difference coding is used for the first, second, and fourth channels. In particular, the code indicates that it has been determined that difference coding is to be applied again to weighted difference signals Δ(1, 3), Δ(2, 5), and Δ(4, 1) of the first, second, and fourth channels generated by the first iteration of the coding type determining process. For example, the parent of the first channel Δ(1, 3) is the third channel, which is the difference signal Δ(3, 5). The end flag $F_{EN}$ of the third channel is 1, which indicates that it has been determined that the difference signal Δ(3, 5) of the third channel obtained as a result of the first iteration of the coding type determining process is to be independently coded. For the sixth channel, it has been determined by the second iteration of the coding type determining process that difference coding is applied to the original sixth channel signal $X_6$ inputted through the input terminal $\mathbf{11}_6$ by using the fourth channel as the parent and a weighting factor of 1. That is, in the second iteration of the coding type determining process, an input channel signal determined to be independently coded as well as the difference signal Δ(i, j) is inputted in the multistage coding section 100 and it can be determined that difference coding using the difference signal Δ(i, j) as the parent is to be applied to the input channel signal that has been previously determined to be independently coded. For example, in the example shown in FIG. 4B, difference coding was not able to be used for the fourth channel signal $E_4$ in the first iteration of the coding type determining process, that is, the fourth channel signal $E_4$ was not able to be compressed. In other words, the conventional method described in the section "Problem to be solved by the invention" cannot compress the fourth channel. In contrast, the recursive process according to the present invention can determine in the second iteration of the coding type determining process that difference coding using difference signal $d_{5,6}$ as the parent is to be applied, thereby further improving the compression rate.

It should be noted that a difference signal obtained in the first iteration of coding type determining process is considered as the input channel signal of the corresponding channel and inputted in the multistage coding section 100 in the second iteration of the coding type determining process. Therefore, because independent coding has been chosen for the third channel by the second iteration of the coding type determining process, difference signal Δ(3, 5) is inputted into the multistage coding section 100 as an input channel signal in the third iteration of the coding type determining process. In this case, the repetition control section 41 in FIG. 5 retrieves Δ(3, 5) from memory area 112*b* in the difference memory 112 and inputs it into the multistage coding section 100 through the selector 42.

The codes $CAi_3$ generated by the third iteration indicates that difference coding is used for the first channel. The parent used in the difference coding of the first channel ΔΔ(1, 3) is the difference signal ΔΔ(2, 5) of the second channel obtained in the second iteration of the coding type determining process. The end flag $F_{EN}$ of the second and sixth channel is 1. The parent used in difference coding of the fourth channel ΔΔ(4, 2) is the difference signal ΔΔ(1, 3) of the first channel. In this example, the coding type determining process ends with the third iteration and end flag $F_{EN}$=1 is assigned to the first and fourth channels which end flag $F_{EN}$ is not set 1 finally.

An auxiliary coding section 45 in FIG. 5 retrieves stored contents from the auxiliary code memory 121 and generates the auxiliary codes CA1-CA6 shown in FIG. 11, that is, number code sequences $CAi_1$, $CAi_2$, and $CAi_3$ of the auxiliary codes CAi of the channels. The parent channel identification numbers j are coded into number codes $C_j$ and weighting factors W(i, j) are coded into weight codes $C_W$. End flags $F_{EN}$ of the sixth channel are set to 1 in the first iteration of the coding type determining process. However, the last one of end flags $F_{EN}$=1 is retained and the end flags $F_{EN}$=1 set in the previous iteration are changed to $F_{EN}$=0 in the auxiliary coding section 45. Number codes $C_j$ and weighting factor codes $C_W$ may be stored when auxiliary codes are stored in each iteration of the coding type determining process in auxiliary code memory 121. Channel identification numbers i, j can be represented by binary numbers in a line, which may be used as the number codes $C_j$.

Figure 10D:
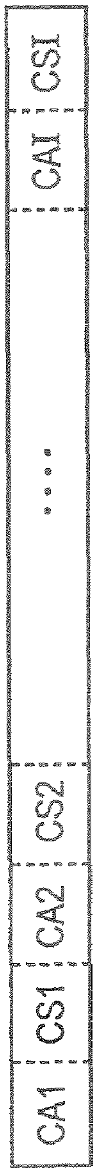
FIG. 10D shows another exemplary multichannel code.
Figure 12:
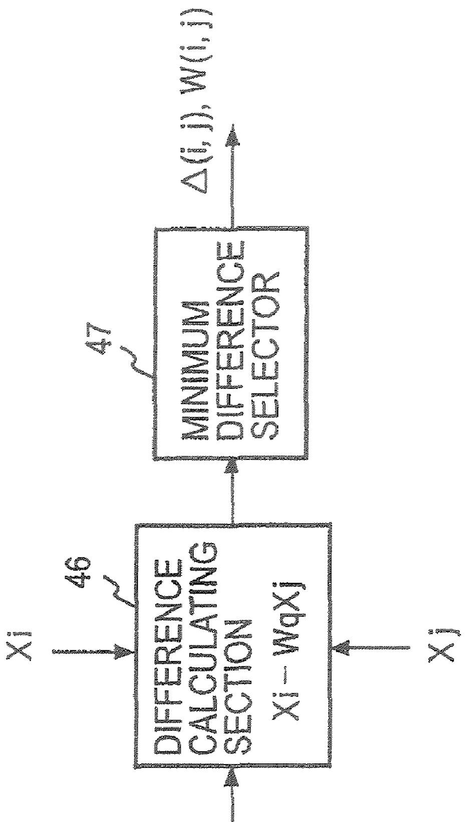
FIG. 12 shows an exemplary functional configuration of a part of a difference generating section 111 in FIG. 5.

The auxiliary code CAi and waveform code CSi of the i-th channel may be paired with each other and the pairs may be arranged in sequence (CA1, CS1), . . . , (CAI, CSI) as shown in FIG. 10D before being outputted as a multichannel coded code from the combiner 44. The coding type determining process may be repeated once or more than two times. The flag $F_R$ (indicating the parent is the same as that in the previous flame) may be omitted. The weighing factor W(i, j) for weighted difference signal may be calculated using a method other than the method described above, as described below. An arrangement as shown in FIG. 12 is provided as the weight determining section 111*a* in the difference generator 111 shown in FIG. 5. A weight memory 48 is provided which contains weighting factors $W_q$ associated with weight identification numbers q (where q=0, 1, . . . ). In this example, a weighting factor β within the range from −1.6 to 1.6 is quantized into a 5-bit number β(q), which is then multiplied by 128 to obtain an integer $W_q$=β(q)×128, and the integer is used as the weighting factor. The weight identification numbers q are represented by five bits and are any of 0 to 31.

To obtain a difference signal Δ(i, j) for a channel signal, for example the i-th channel signal $X_i$, a difference calculating section 46 subtracts the product of another channel signal (parent signal) $X_j$ and each weighting factor $W_q$ from the i-th channel signal $X_i$. A minimum difference selector 47 selects the minimum value among the 32 differences calculated by the difference calculating section 46 and outputs it as a difference signal Δ(i, j) and also outputs as the weighting factor W(i, j) the weighting factor $W_q$ that provides the minimum value.

As stated above, all possible pairs are examined to find pairs that minimize the amount of a multichannel coded code. In the example described above, in each iteration of coding type determining process in the multistage coding section 100, pairs of an independent coding channel and difference coding channel are sequentially chosen from among all pairs so that the sum of energies of signals, excluding auxiliary codes currently being outputted, is minimized. However, as the number I of channels increases, significant amounts and time of processing will be required for examining all pairs.

Figure 13C:
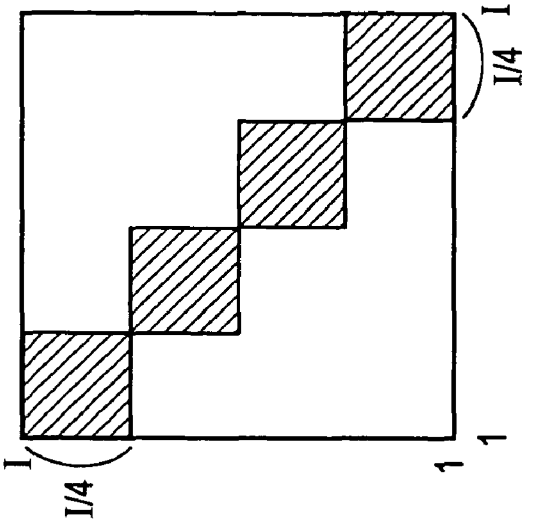
FIG. 13C is a diagram illustrating coding search performed at step S2 in FIG. 6 through four groups into which all channels are divided.
Figure 13B:
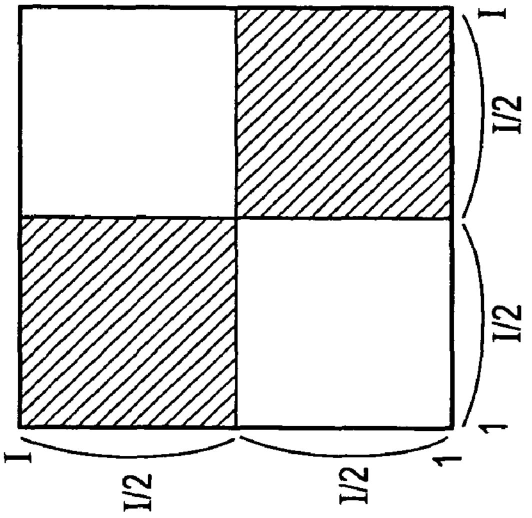
FIG. 13B is a diagram illustrating coding search performed step S2 in FIG. 6 through two groups into which all channels are divided.
Figure 13A:
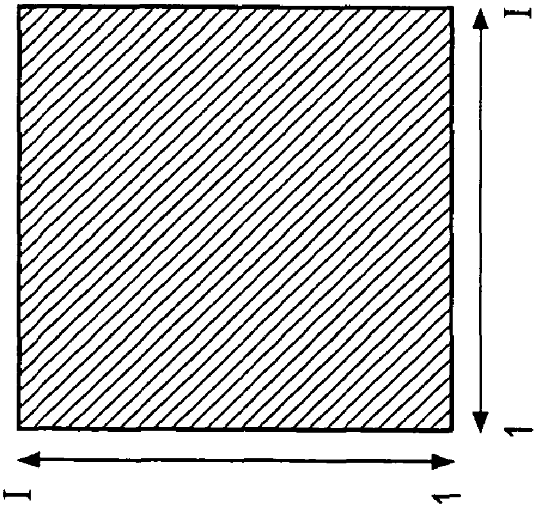
FIG. 13A is a diagram illustrating coding search through all channels at step S2 in FIG. 6.

That is, in the sequential processing described above, channel identification numbers 1-I are arranged along the vertical and horizontal axes as shown in FIG. 13A and the pairs of the channels represented by the coordinate points in the two-dimensional domain are examined (searched) one by one.

The two-dimensional domain may be divided into sub-areas and only some of those sub-areas may be searched in the coding type determining process. For example, only the hatched sub-areas in the two-dimensional domain shown in FIG. 13B may be searched through. That is, a sub-area defined by 1 . . . I/2 on the horizontal axis and I/2+1 . . . I on the vertical axis and a sub-area defined by I/2+1 . . . I on the horizontal axis and 1 . . . I/2 on the vertical axis may be searched through. Alternatively, as shown in FIG. 13C, each of the vertical and horizontal axes of the two-dimensional domain is divided into four and only the four sub-areas along a diagonal of the two-dimensional domain in the resulting 16 sub-areas may be searched through.

Dividing the search domain as described above may slightly degrade the performance of compression but can prevent an explosive increase in the amount of processing due to the increase of the number of channels. Performance deterioration caused by the division can be minimized as follows, for example. All channel signals are clustered according to the similarity between them (the distance between the signals) in advance and the channels may be rearranged so that channels close to one another are fall in the same sub-area.

Second Embodiment

Figure 14:
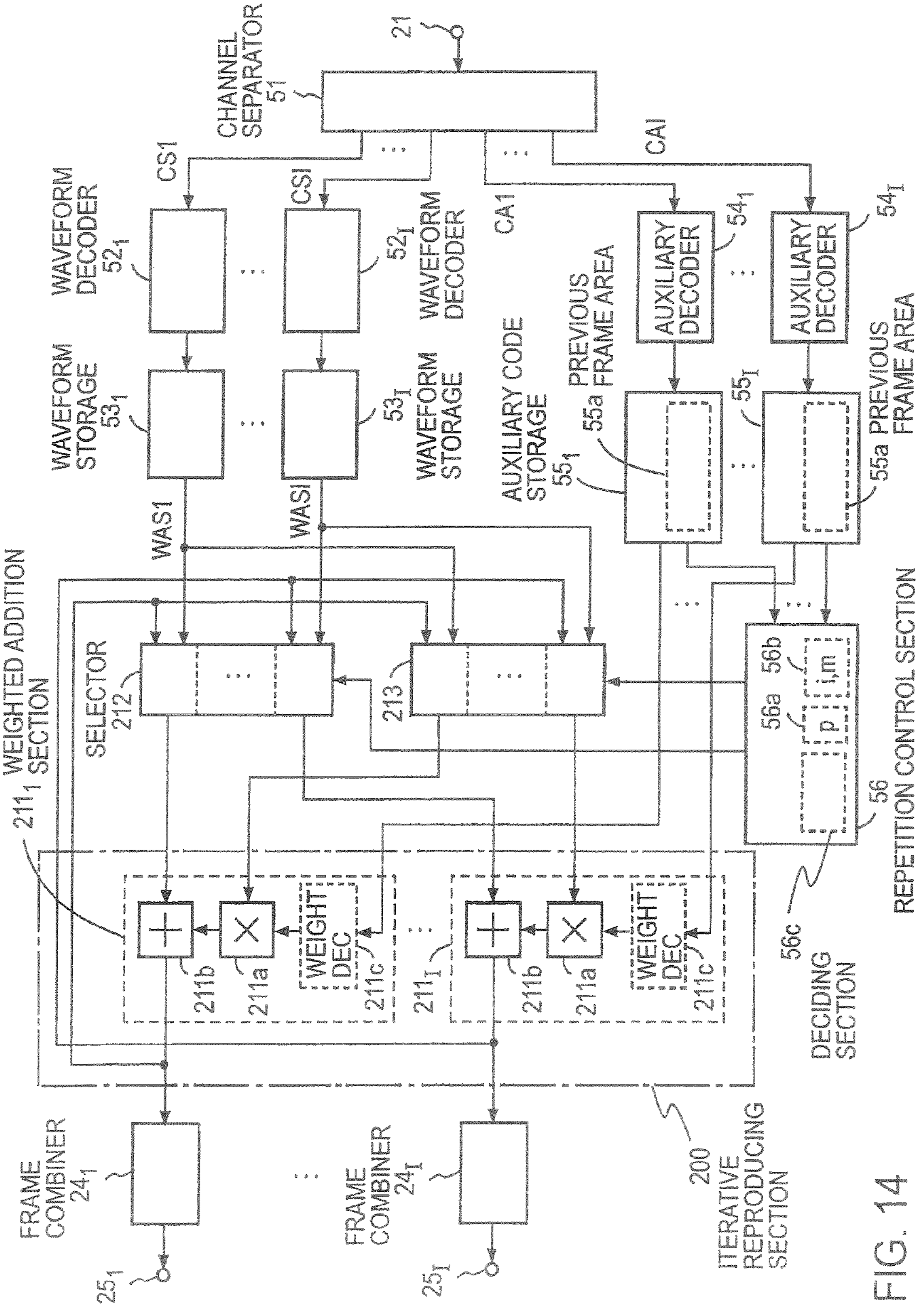
FIG. 14 shows an exemplary functional configuration of a decoding apparatus according to the present invention.
Figure 15:
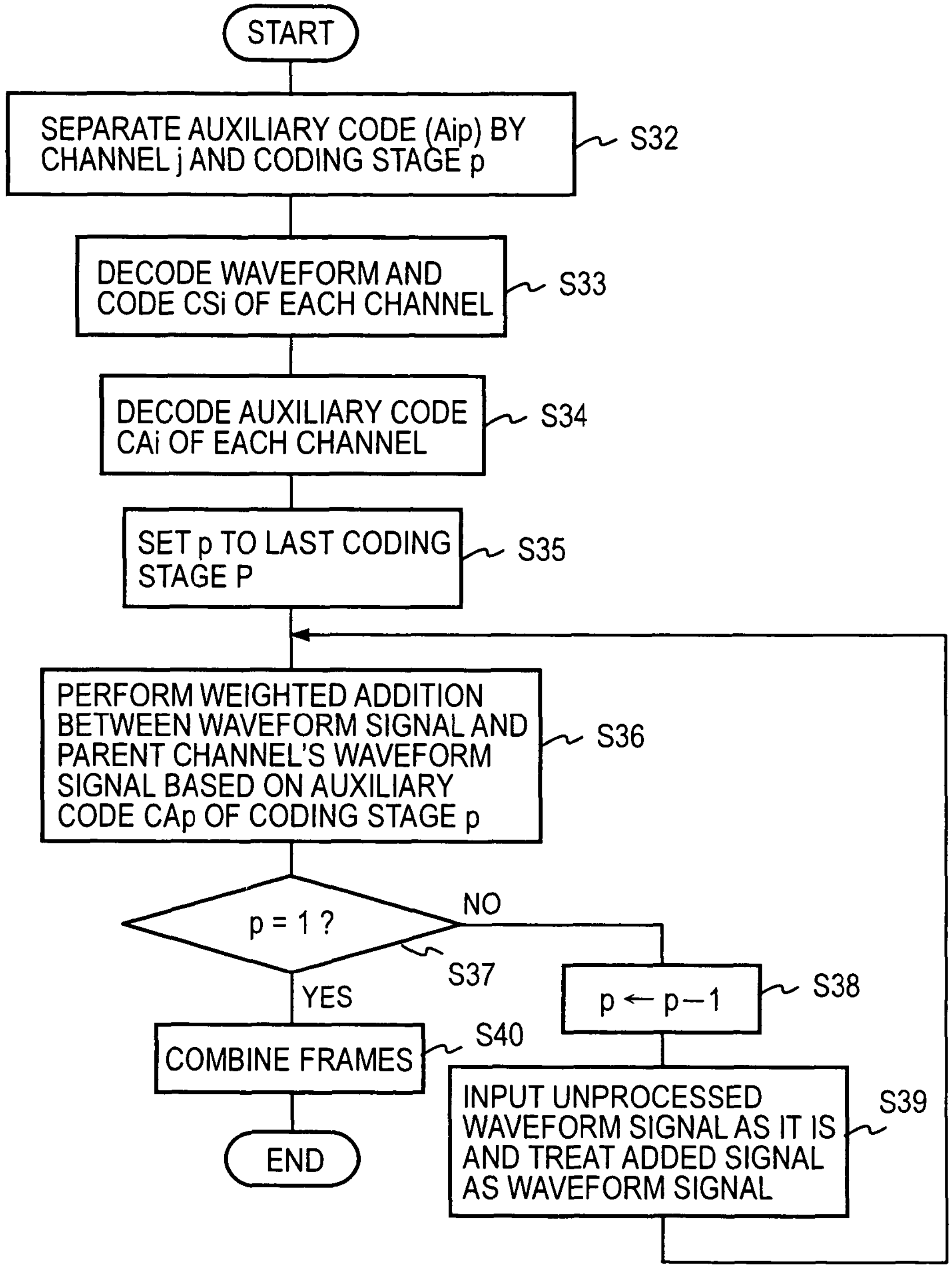
FIG. 15 shows an exemplary process for a decoding method according to the present invention.

In the second embodiment, a decoding method according to the present invention will be described. FIG. 14 shows an exemplary functional configuration of a decoding apparatus and FIG. 15 shows a process performed in the decoding apparatus. A multichannel coded code, for example the multichannel coded code shown in FIG. 10A is inputted in a channel separator 51 through an input terminal 21. The channel separator 51 separates waveform codes CS1-CSI from auxiliary codes CA1-CAI, and provides the waveform codes CS1-CSI to waveform decoders $\mathbf{52}_1$-$\mathbf{52}_I$ and provides the auxiliary codes CA1-CAI to auxiliary code decoders $\mathbf{54}_1$-$\mathbf{54}_I$ (step S32). The waveform decoders $\mathbf{52}_1$-$\mathbf{52}_I$ decode the waveform codes CS1-CSI, respectively, to generate waveform signals WAS1-WASI by using a lossless expansion-decoding scheme corresponding to the lossless compressive coding scheme used in the waveform coders $\mathbf{43}_1$-$\mathbf{43}_I$ in FIG. 5, and stores them in waveform storages $\mathbf{53}_1$-$\mathbf{53}_I$ (step S33). The auxiliary code decoders $\mathbf{54}_1$-$\mathbf{54}_I$ decode the auxiliary codes CA1-CAI, respectively, and temporarily stores the decoded results in the auxiliary code storages $\mathbf{55}_1$-$\mathbf{55}_I$ (step S34). It should be noted that any of steps S33 and S34 may be performed first or both of steps S33 and S34 may be performed in parallel.

In the second embodiment, the waveform signals generated in the iterations of the coding type determining process and waveform signals in the auxiliary codes are decoded according to the auxiliary codes. The decoding is performed in the reverse of the order of the coding, starting with the last iteration of the coding type determining process. If the iteration of the coding type determining process is the P-th iteration, an iteration parameter p stored in a register 56*a* in a repetition control section 56, which performs an iterative multistage decoding process, is set to P (step S35). According to an instruction from the repetition control section 56, selectors 212 and 213 retrieve the waveform signals WAS1-WASI from the waveform storages $\mathbf{53}_1$-$\mathbf{53}_I$ and input them in an iterative reproducing section 200. Weighted addition sections $\mathbf{211}_1$-$\mathbf{211}_I$ in the iterative reproducing section 200 reproduces signals before subtraction by weighted addition based on auxiliary codes $CA1_p$-$CAI_p$ in the p-th iteration to reproduce, from the input waveform signals WAS1-WASI (step S36).

On completion of reproduction of the codes of the channels in the p-th iteration, a deciding section 56*b* decides whether p is equal to 1 (step S37). That is, the deciding section 56*b* decides whether the reproduction of the codes obtained in the first iteration of coding type determining process has been completed. If p≠1 at step S37, p is decremented by 1 (step S38) and the waveform signals that have not been processed in this reproduction stage (process) are treated as input waveform signals of the corresponding channels. Signals resulting from the weighted addition are inputted in the iterative reproduction section 200 as input waveform signals of the corresponding channels (step S39), and then the process returns to step S36. If p=1 at step S37, frame combiners $\mathbf{24}_1$-$\mathbf{24}_I$ sequentially combine the sum waveform signals from the weighted addition sections $\mathbf{211}_1$-$\mathbf{211}_I$, respectively, and output reproduction signals $X_1$-$X_I$ to output terminals $\mathbf{25}_1$-$\mathbf{25}_I$.

Figure 16:
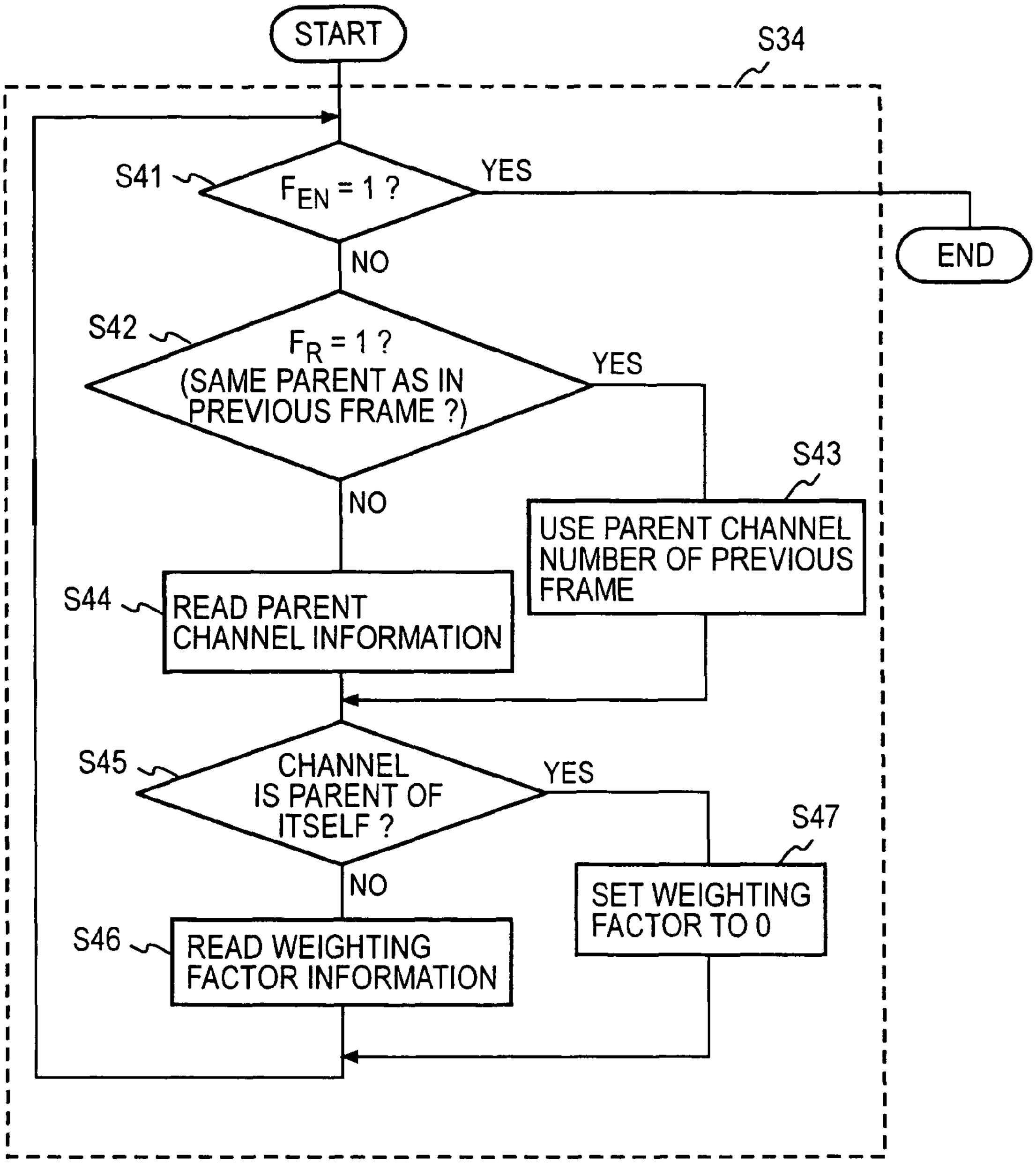
FIG. 16 shows an example of a specific process performed at step S34 in FIG. 15.

An example of the decoding process performed in an auxiliary decoder $\mathbf{54}_i$ will be described with reference to FIG. 16. It is assumed here that auxiliary codes CAi are sequenced $CAi_1$, $CAi_2$, $CAi_3$ in order of iteration number as shown in FIG. 10B, and the codes generated in the p-th iteration are arranged in the following order: end flag $F_{EN}$, same-as-previous-frame flag $F_R$, parent channel identification number j, and weighting factor code $C_W$ (or weighting factor W(i, j)). An end flag $F_{EN}$ is inserted in the position at which the auxiliary code of each channel ends. The numbers of bits of the flags, parent channel identification number, and, weighting factor are predetermined. The auxiliary decoding process generates auxiliary codes as shown in FIG. 11, for example.

Decoding of the auxiliary codes CAi starts at p=1. First, end flag $F_{EN}$ is checked to check whether it is set to 1 at step S41. For example, because the auxiliary code $CA5_1$ of the fifth channel shown in FIG. 11 has the end flag $F_{EN}$ set to 1, decoding of the fifth channel will end. If the end flag $F_{EN}$ is 0, the process proceeds to step S42, where decision is made as to whether the parent is the same as that in the previous frame. If $F_R$=1, then the parent channel identification number j of the i-th channel's auxiliary code CAi in the p-th iteration is read from previous-frame area 55*a* in auxiliary code storage $\mathbf{55}_i$ and is used as the parent channel identification number j (step S43). In this case, a weighting factor code $C_W$ follows the $F_R$=1 in the auxiliary code sequence.

If $F_R$=0 at step S42, the parent channel identification number j is obtained from the code that follows the $F_R$ (step S44). After the parent channel identification number is decoded (obtained), check is made as to whether the parent channel is the i-th channel itself (step S45). If the parent channel is not the i-th channel itself, the next code $C_W$ is obtained and decoded to obtain a weighting factor W(i, j) (step S46). For example, in the auxiliary code $CA1_i$ of the first channel in FIG. 11 in the first iteration of the decoding, the parent channel identification number is decoded into 3 and the weighting factor code $C_W$=10 is decoded into the weighting factor code W(1, 3)=76/128=0.59375. If it is determined at step S45 that the i-th channel is the parent channel of itself, the weighting factor W(i, j) is set to 0, instead of reading the next code (step S47). In this way, the auxiliary codes CA shown in FIG. 11 are decoded and stored in the auxiliary storages 55*i.*

Figure 17:
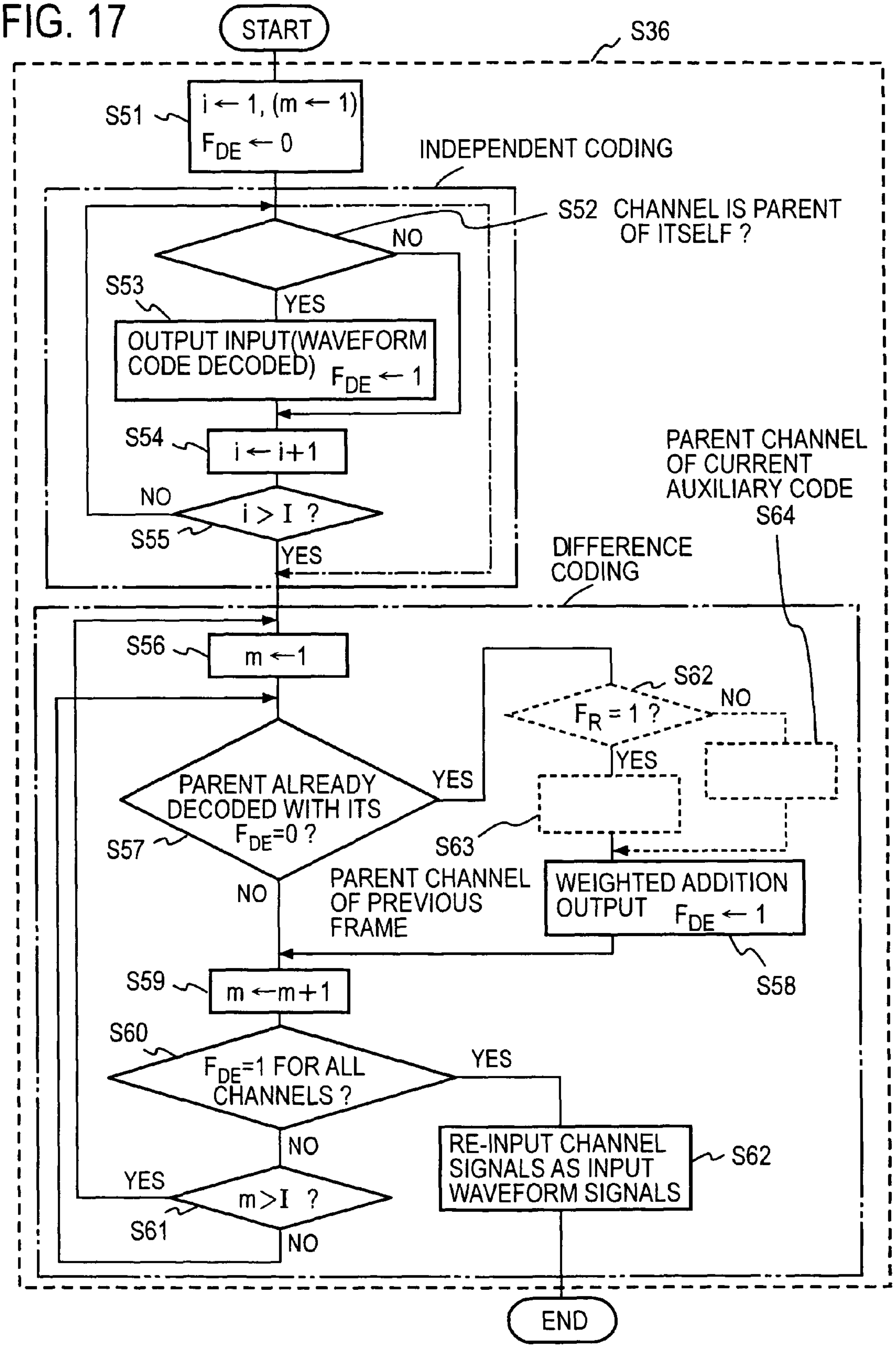
FIG. 17 shows an example of a specific process performed at step S36 in FIG. 15.

Returning to FIG. 14, in the iterative reproducing section 200 for example the process shown in FIG. 17 is performed according to an instruction from the repetition control section 56. FIG. 17 shows details of the process performed at step S36 of FIG. 15. First, the channel identification number "i" is initialized to 1 and a decoding completion flag $F_{DE}$ is initialized to 0 (step S51). Then decision is made as to whether the i-th channel is the parent channel of itself (step S52). If the i-th channel is the parent channel, the input waveform signal of the i-th channel is outputted, the decoding completion flag $F_{DE}$ is set to 1 (step S53), and "i" is incremented to i+1 (step S54). If it is determined at step S52 that the i-th channel is not the parent of itself, then the process proceeds to step S54. After step S54, decision is made as to whether "i" is greater than the number of channels, I, if "i" is smaller than or equal to I (step S55), the process returns to step S52. In this way, a waveform signal decoded from an independently coded code in each iteration of iterative waveform reproduction is provided to an weighted addition section $\mathbf{211}_i$. In the case of the auxiliary codes in FIG. 11 and p=4, there will be outputted ΔΔΔ(1, 2) of auxiliary code CA1, ΔΔ(2, 5) of CA2, Δ(3, 5) of CA3, ΔΔΔ(4, 1) of CA4, the decoded waveform signal $X_5$ of CA5, and ΔΔ(6, 4) of CA6. When p=3, difference coding has been used for CA1 and CA4, therefore ΔΔ(2, 5) of auxiliary code CA2, Δ(3, 5) of CA3, and decoded waveform signal $X_5$ of CA5, and ΔΔ(6, 4) of CA6 are outputted.

If it is determined at step S55 that "i" is greater than "I", m is initialized to 1 (step S56). Then, decision is made as to whether the decoding completion flag $F_{DE}$ of the m-th channel is 0 and the parent has been already decoded (step S57). If determination at step S57 is Yes, a weighted addition section $\mathbf{211}_m$ (where m=1, 2, . . . , I) performs weighted addition of the parent's waveform signal to the input m-th channel waveform signal to provide a sum waveform signal, and sets the decoding completion flag $F_{DE}$ to 1 (step S58). If determination at step S57 is No, step S58 is skipped. Then, m is incremented to m+1 (step S59). Decision is made as to whether the decoding completion flags $F_{DE}$ of all channels are 1 (step S60). If any of the channels have the $F_{DE}$ flag that is not set to 1, decision is made as to whether m>I (step S61). If determination at step S61 is Yes, the process returns to step S56; otherwise, the process returns to step S57. If it is determined at step S60 that decoding completion flags $F_{DE}$ of all channels are 1, the waveform signals outputted from the weighted addition sections $\mathbf{211}_1$-$\mathbf{211}_I$ are inputted again in the iterative reproducing section 200 as the first—I-th input waveform signals (step S62). When p=4 in the auxiliary code in FIG. 11, all channels have been coded using independent coding and therefore no channels are decoded by difference decoding. When p=3, ΔΔΔ(1, 2)+β(19)×ΔΔ(2, 5) of auxiliary code CA1 and ΔΔΔ(4, 1)+β(27)×ΔΔ(1, 3) of CA4 are obtained by difference decoding. When p=3 in the independent decoding process, the results of decoding of CA2, CA3, and CA5, and CA6 have been obtained, therefore the third (p=3) iteration of the decoding of all of the six channels has been completed.

Steps S56 to S61 described above are the steps of reproducing difference-decoded waveform signals. For example, the first iteration of reproduction of the first channel coded code is performed on the basis of code $\mathrm{CA}\mathbf{1}_3$ of the third iteration of coding of the first channel shown in FIG. 11. The parent channel j of code $\mathrm{CA}\mathbf{1}_3$ of the third iteration is 2 and the waveform signal of the parent has not been decoded in the steps before step S56. However, reproduction of the channel is performed in the first iteration of the reproduction at step S56 and the subsequent steps. Similarly, the parent channel j of code $\mathrm{CA}\mathbf{4}_3$ of the third iteration of coding of the fourth channel is 1 and the input waveform signal of the first channel has not been processed (decoded) in the first iteration of the reproduction process, therefore the input waveform signal of the fourth channel cannot be processed. However, if it is determined at step S61 that m=I, the process returns to step S56 and the reproduction process for the fourth channel input waveform signal is performed in the second iteration of the reproduction process at this stage based on the determination. The first channel signal $X_1$ will be reproduced by weighted addition using difference signal ΔΔ(2, 5) based on the code $\mathrm{CA}\mathbf{1}_3$ of the third iteration of coding as the parent of ΔΔΔ(1, 2) based on the code $\mathrm{CA}\mathbf{1}_4$ of the fourth iteration of coding, weighted addition using difference signal Δ(3, 5) based on code $\mathrm{CA}\mathbf{1}_2$ of the second iteration of coding as the parent, and weighted addition using channel signal $X_3$ based on code $\mathrm{CA}\mathbf{1}_1$ of the first iteration of coding as the parent. That is, $X_1$=ΔΔΔ(1, 2)+β(19)×ΔΔ(2, 5)+β(15)×Δ(3, 5)+β(10)×$X_3$.

As stated earlier, independent coding can be considered as weighted difference coding using a channel itself as its parent and using a weighting factor of 0. To perform a reproduction process according to this notion, "m" may be initialized to 1 at step S51 of FIG. 17 as shown in the parentheses, instead of initializing "i" to 1, and then the process may proceed from step S51 to step S56 as shown by a one-dotted chain line.

If the flag $F_R$ indicating whether the parent is the same as that in the previous frame is used in this reproduction process, steps represented as dashed blocks in FIG. 17 are added. In particular, if determination at step S57 is Yes, decision is made as to whether the flag $F_R$ is 1 (step S62). If it is the same, the parent channel in the auxiliary code of the corresponding channel of the previous frame at step S63 is used. If the parent is not the same, the parent channel indicated in the current auxiliary code is used at step S64 and the process proceeds to step S58.

To perform the process shown in FIG. 17, each of waveform signals outputted from the weighted addition sections $\mathbf{211}_1$-$\mathbf{211}_I$ in FIG. 14 is inputted in the selectors 212 and 213. Also inputted in the weighted addition sections 212 and 213 are decoded waveform signals WAS1-WASI from the waveform storages $\mathbf{53}_1$-$\mathbf{53}_I$, respectively. Each of the selectors 212 and 213 selects one of the decoded waveform signal and the waveform signal outputted from the weighted addition section as the input into each channel, in accordance with an instruction from the repetition control section 56. The selector 212 inputs the selected waveform signal into an adder 211*b* in the weighted addition section $\mathbf{211}_1$-$\mathbf{211}_I$. That is, the selector 212 inputs it as a child channel waveform signal. The selector 213 inputs the selected waveform signal into a multiplier 211*a* in the weighted addition section $\mathbf{211}_1$-$\mathbf{211}_I$. That is, the selector 213 inputs the signal as a parent channel waveform signal. Each of the decoding weighting factors from the auxiliary code storages $\mathbf{55}_1$-$\mathbf{55}_I$ is inputted in an associated multiplier 211*a*. The product from each of the multipliers 211*a* is inputted in its associated adder 211*b* and the sum from the adder 211*b* is outputted from the weighted addition section $\mathbf{211}_1$-$\mathbf{211}_I$ as a waveform signal. The weighting code $C_W$ may be decoded at a weight decoder 211*c* in each weighted addition section, rather than in the auxiliary code decoders $\mathbf{54}_1$-$\mathbf{54}_I$. Provided in the repetition control section 56 are registers 56*a*, 56*b* for storing parameters p, i, and, m used for the process described above and a deciding section 56*c* which makes decision at each decision step in FIGS. 15 and 17. Although not shown in the diagrams, storage for storing $F_{ED}$ associated with each channel is also provided.

The waveform code of each channel may be decoded when its decoded waveform signal is required, rather than decoding it in advance. In that case, the waveform code CSi of the channel (the channel that is the parent of itself) is decoded and the decoded waveform signal ASi is outputted as shown in the parentheses in step S53 in FIG. 17. The last coding stage is performed only for codes with end flag $F_{EN}$=1. For example, the iterative reproduction process is started from the coding stage next to the third iteration code $CAi_3$, that is, the fourth iteration code $CAi_4$, in the example shown in FIG. 11. The end flag $F_{EN}$ of the fourth iteration codes $CA1_4$ and $CA4_4$ in FIG. 11 is 1 and these codes have parent channels j=1 and j=4, respectively, that is, their parents are themselves. The waveform codes CS1 and CS4 are decoded in the first iteration of the reproduction process. Then, the second iteration of the reproduction process is performed for the third iteration coding code $CAi_3$.

While the reproduction coding process described above is performed for each coding iteration code, codes that can be reproduction-coded may be processed on the basis of the auxiliary code in the code of multi channel, in order, starting with the first channel, and codes that cannot be reproduction-decoded may be skipped. After the process for the last I-th channel is completed, codes that can be processed may be processed, in order, starting with the first channel. This process is repeated. In doing this, a decoded waveform signal, decoded difference signal, addition signal (difference signal), WASi, Δ(i, j), ΔΔ(i, j), and so on obtained as a result of each iteration are stored in a storage and an appropriate parent is retrieved from the storage and used for weighted addition.

Figure 18:
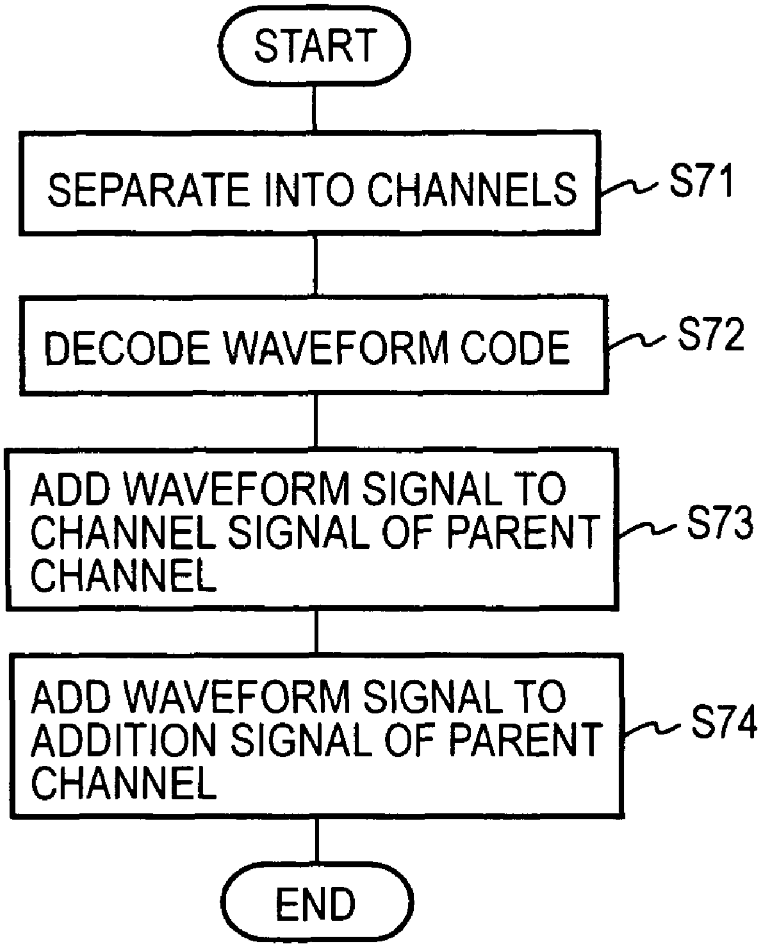
FIG. 18 shows a basic process of a decoding method according to the present invention.

As will be understood from the foregoing, the decoding method according to the present invention is characterized by repeating weighted addition in such a manner that weighted addition between a difference waveform signal and another waveform signal is performed to reproduce a waveform signal and then weighted addition between the waveform signal reproduced by the weighted addition and another difference signal is performed to reproduce another waveform signal. Therefore, any processing procedure for the decoding method may be used that includes the process shown in FIG. 18. In particular, a multichannel coded code is separated into channel codes (step S71), at least one of independent coded code is decoded to generate a channel waveform signal (step S72). The channel waveform signal is used as the parent to perform weighted addition of another waveform signal to generate a difference waveform signal or a channel waveform signal (step S73). The waveform signal generated by the weighted addition is used as the parent to perform weighted addition of another waveform signal to generate another channel waveform signal or difference signal (step S74).

Third Embodiment

The present invention can also be applied to a prediction error signal series or a prediction parameter series resulting from linear prediction performed for each channel as well as a signal series itself. If the present invention is applied to both of them, each auxiliary code may be independently used. If part of an auxiliary code (for example a parent channel identification number) is the same, the auxiliary code may be shared.

Figure 19:
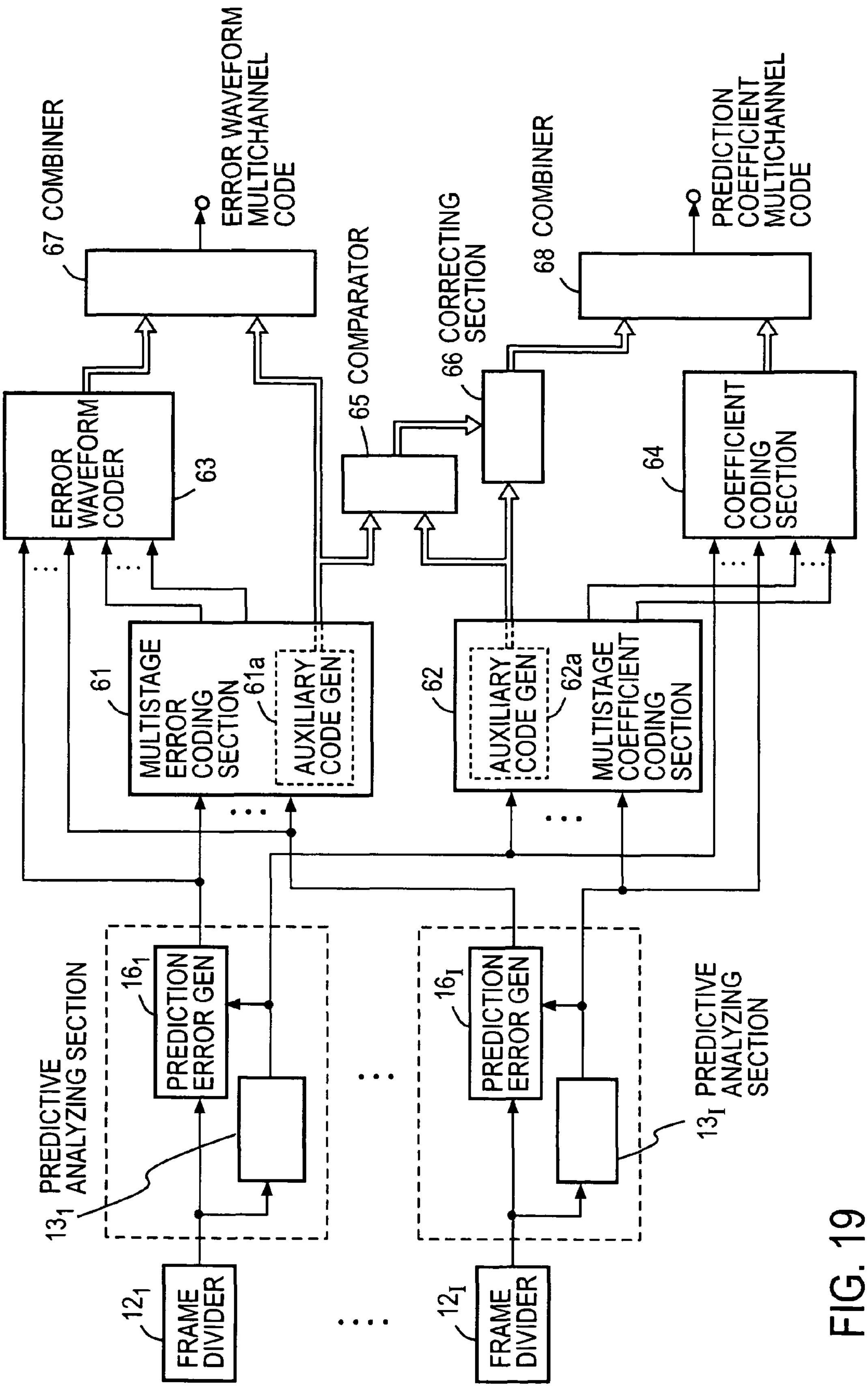
FIG. 19 shows an exemplary functional configuration of a coding apparatus in which the present invention is applied to multichannel prediction error signals and its prediction coefficient signals.

An example of this is shown in FIG. 19. Channel signals from frame dividers $\mathbf{12}_1$-$\mathbf{12}_I$ are inputted in prediction analyzing sections $\mathbf{13}_1$-$\mathbf{13}_I$, respectively, and prediction error generators $\mathbf{16}_1$-$\mathbf{16}_I$, respectively. As depicted in FIG. 1A and described earlier, prediction error signals are generated in the prediction error generators $\mathbf{16}_1$-$\mathbf{16}_I$. These prediction error signals are inputted in a multistage error coding section 61. Prediction coefficient signals generated in the prediction analyzing sections $\mathbf{13}_1$-$\mathbf{13}_I$ are inputted in a multistage coefficient coding section 62. The multistage error coding section 61 and the multistage coefficient coding section 62 have the same functional configuration as that of the multistage coding section 100 depicted in FIG. 5 and described above. Difference signals from the multistage error coding section 61 and prediction error signals to be independently coded are inputted in an error waveform coder 63. The error waveform coder 63 codes the prediction error signal or its difference signal of each channel. Similarly, prediction coefficient signals to be independently coded or difference signals from the multistage coefficient coding section 62 are inputted in a coefficient coding section 64. The coefficient coding section 64 codes the prediction coefficient signal or its difference signal of each channel. A comparator 65 compares an auxiliary code from an auxiliary code generator 61*a* in the multistage error coding section 61 with an auxiliary code from an auxiliary code generator 62*a* in the multistage coefficient coding section 62 to see whether the parent channel identification numbers of the same channel are identical to each other. If they are identical, a correcting section 66 simply sets, instead of the parent channel identification number of corresponding one of the channels (for example an auxiliary code from the multistage coefficient coding section 62), a flag indicating that the channel identification number is the same as the corresponding channel in the auxiliary code of the prediction error signal. A combiner 67 combines the waveform code from the error waveform coder 63 with its corresponding auxiliary code to generate a multichannel coded code of the prediction error signal. Another combiner 68 combines the coefficient code from the coefficient coding section 64 with the auxiliary code from the correcting section 66 to generate a multichannel coded code of the prediction coefficients. In each of the error waveform coder 63 and the coefficient coding section 64, there are provided waveform selectors $\mathbf{49}_1$-$\mathbf{49}_I$ shown in FIG. 5 though not shown in FIG. 19. If prediction parameters (prediction coefficient) are PARCOR coefficients, it is preferable that the difference signals generated in a coding type determination process be limited to low-order difference signals or the weighting factor β be a number that is decreased with increasing order of a parameter coefficient, rather than a constant.

Fourth Embodiment

It has been proposed in the past to group signals of multiple channels in pairs of signals and to stereo-code one of each pair of signals into the left signal L of a stereo signal and the other into the right sinal R. An embodiment of the present intention to which this idea is partially applied will be described below. As shown in FIG. 20A, pairs signals of multiple channels are inputted in stereo coding signal generators 71 through input terminals $\mathbf{11}_1$-$\mathbf{11}_I$. Each of the stereo coding signal generators 71 generates a difference signal L-R between the stereo left signal L which is one of two input signals, and the right signal R, which is the other. The stereo coding signal generator 71 also selects two of the tree signals that have the smallest code amount, or smaller energies. Each of prediction error generators $\mathbf{16}_1$-$\mathbf{16}_I$ generates a prediction error signal from the two signals provided from each stereo coding signal generator 71 and inputs it in a multichannel coding section 72 as a multichannel signal $X_1$-$X_I$ in FIG. 5. Provided in the multichannel coding section 72 is a multistage coding section 100 as shown in FIG. 5. This process can improve the compression rate compared with directly coding input signals of multiple channels in a multichannel coding section.

Figure 2:
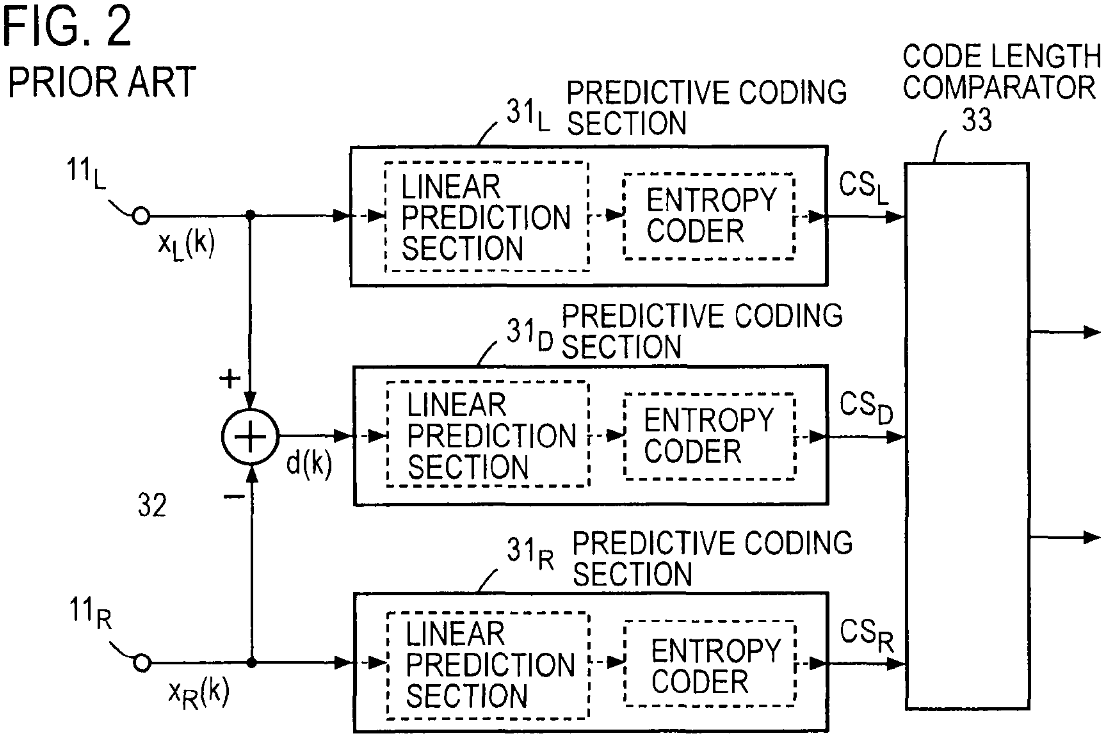
FIG. 2 PRIOR ART
FIG. 2 shows a functional configuration of a conventional stereo signal coding apparatus.
Figure 20B:
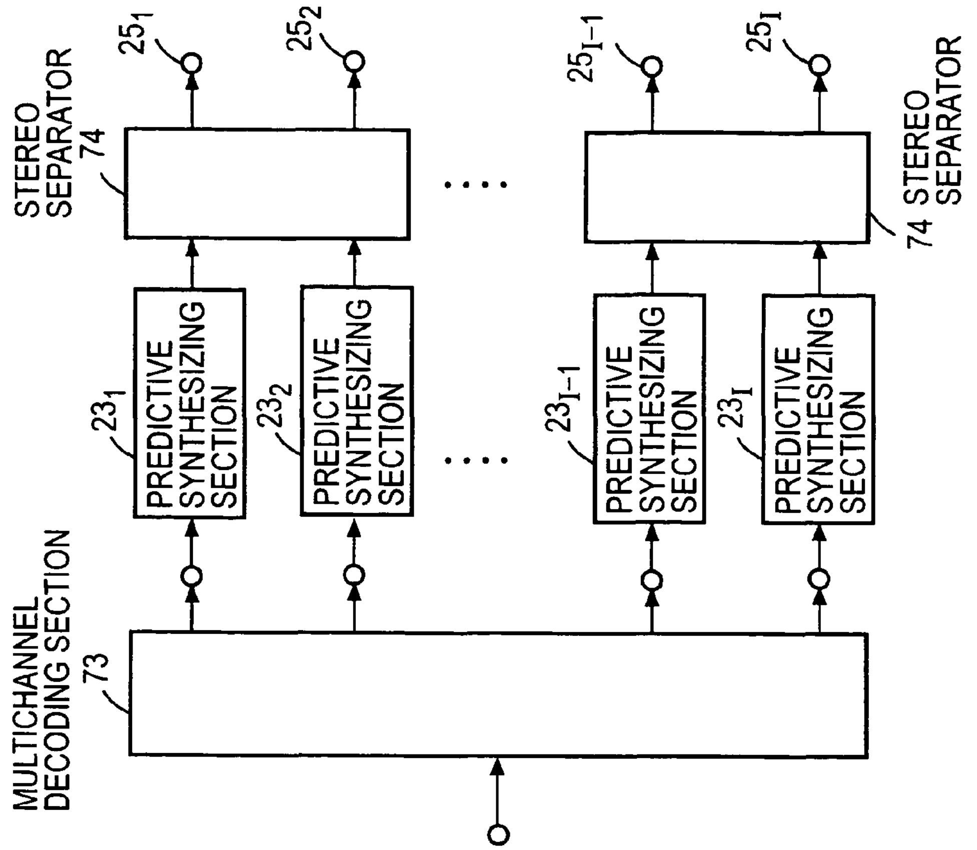
FIG. 20B shows an exemplary functional configuration of a decoding apparatus which decodes codes generated by the coding apparatus shown in FIG. 20A.
Figure 20A:
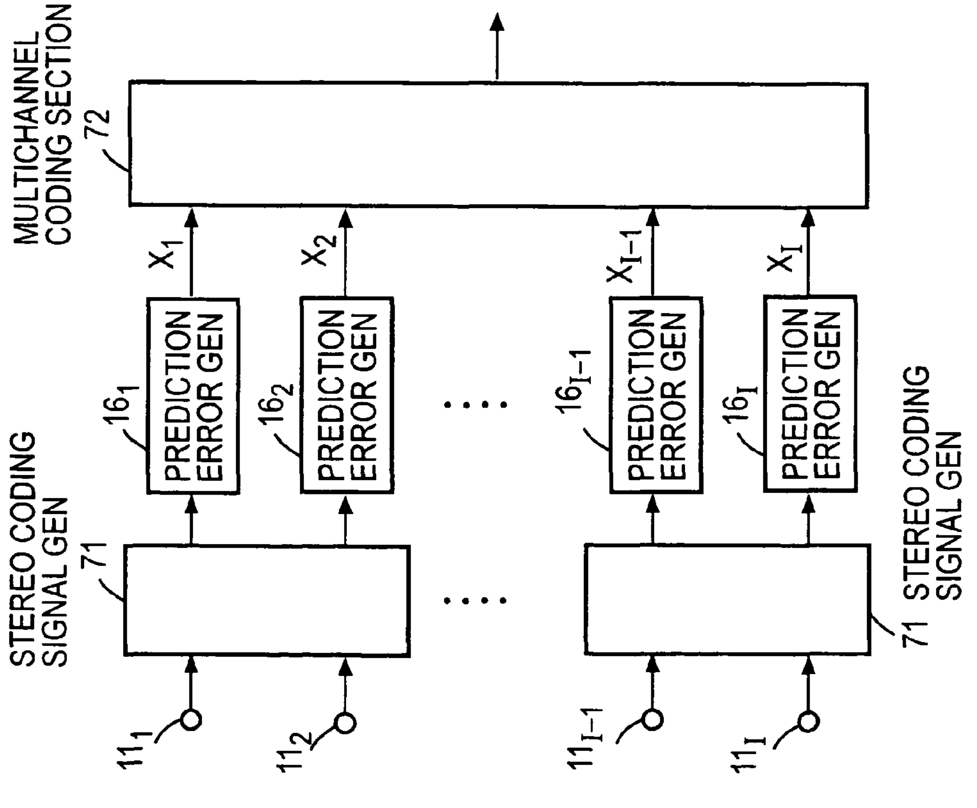
FIG. 20A shows an exemplary functional configuration of a coding apparatus in which multichannel signals are grouped in pairs for stereo coding and the present invention is applied to the pairs.

FIG. 20B shows a functional configuration of an apparatus at a decoding end. Provided inside a multichannel decoding section 73 is an iterative reproducing section 200 as shown in FIG. 14. A multichannel coded code is inputted in the multichannel decoding section 73. Reproduction channel signals from the iterative reproducing section 200 in the multichannel decoding section 73 are inputted in predictive synthesizing sections $\mathbf{23}_1$-$\mathbf{23}_I$, where predictive synthesis is performed. The predictive-synthesized output signals are grouped in pairs in order starting with the first channel as in the coding process, and are inputted in stereo separators 74. Each of the stereo separators 74 outputs a left signal L and a right signal R based on the two input signals. Also inputted in the stereo separator 74 is a code indicating which two of the three signals, L, R, and L-R were inputted in the stereo separator 74. That is, as in the conventional stereo coding apparatus described with reference to FIG. 2, a code indicating which two of the three signals correspond to the output signals is also outputted and decoding will be performed in accordance with the code.

Figures 21A, 21B:
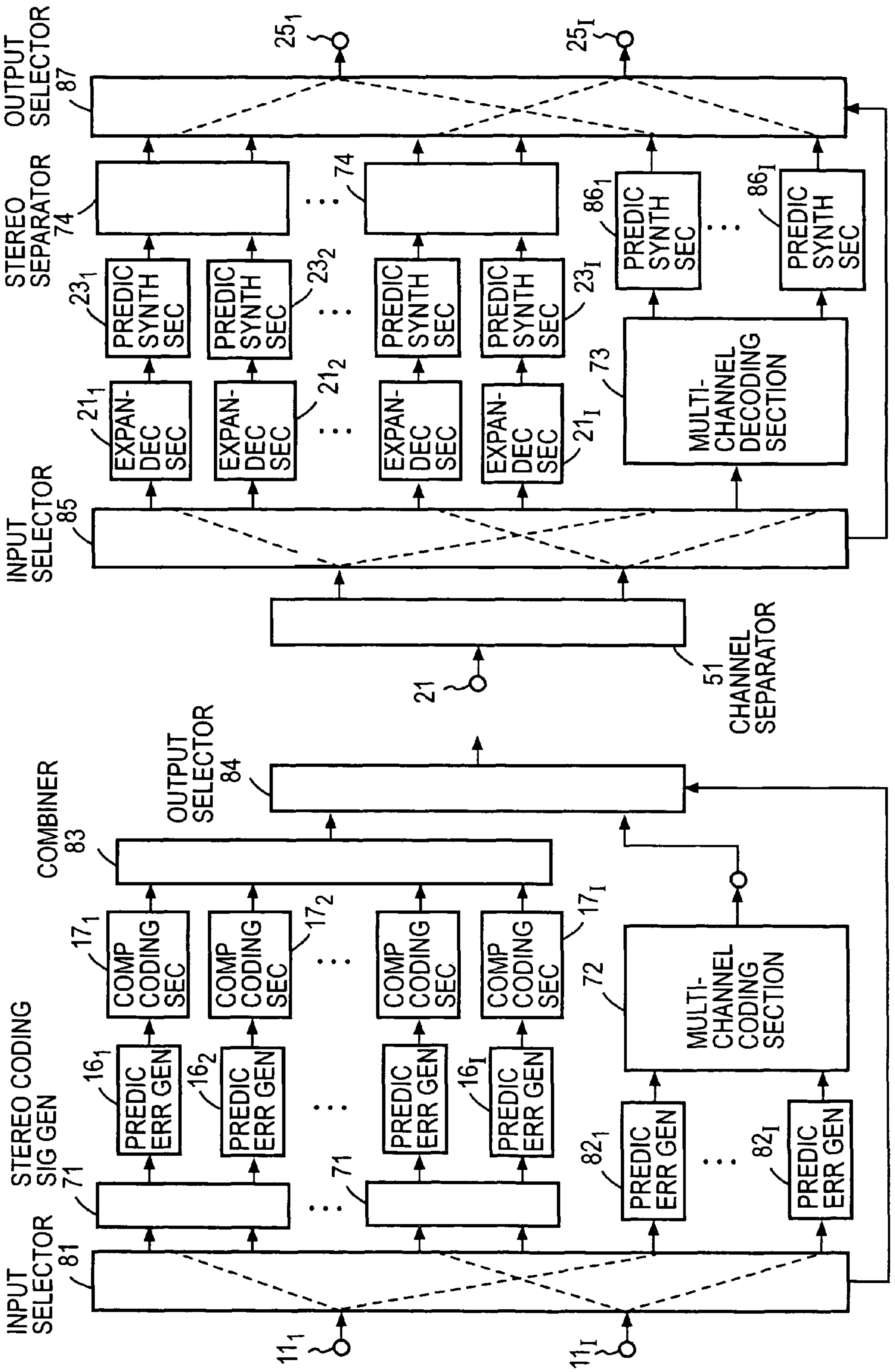
FIG. 21A shows an exemplary functional configuration of a coding apparatus which performs stereo coding of pairs of multichannel signals or the iterative coding of prediction error signals shown in FIG. 5, whichever provides a smaller amount of compressed data.
FIG. 21B shows an exemplary functional configuration of a decoding apparatus which decodes codes generated by the coding apparatus shown in FIG. 21A.

Depending on circumstances, the following method can further increase the compression rate, although the amount of processing increases. For example, as shown in FIG. 21A, an input selector 81 groups channel signals inputted through input terminals $\mathbf{11}_1$-$\mathbf{11}_I$ in pairs in order starting with the first channel and inputs the pairs in stereo coding signal generators 71 described with reference to FIG. 20A. Each of prediction error generators $\mathbf{16}_1$-$\mathbf{16}_I$ generates a prediction error signal from the two signals provided from the stereo coding signal generator 71. Compressive coding sections $\mathbf{17}_1$-$\mathbf{17}_I$ code prediction error signals using lossless compressive coding such as entropy coding and provides the codes to a combiner 83, which outputs a multichannel coded code. The input selector 81 also inputs the input channel signals to prediction error generators $\mathbf{82}_1$-$\mathbf{82}_I$. The prediction error generators $\mathbf{82}_1$-$\mathbf{82}_I$ input prediction error signals into a multichannel coding section 72 as channel signals $X_1$-$X_I$. The multichannel coding section 72 outputs a multichannel coded code. An output selector 84 selects one of the multichannel coded codes provided from the combiner 83 or the multichannel coding section 72 depending on the selection at the input selector 81.

Decoding of the multichannel coded code is performed as shown in FIG. 21B, for example. An input multichannel coded code is separated into channel codes, the first to I-th channel codes, by a channel separator 51. An input selector 85 inputs the separated first to I-th channel codes into expansion-decoding sections $\mathbf{21}_1$-$\mathbf{21}_I$ or a multichannel decoding section 73 according to a code indicating the selection at the output selector 84 at the coding end. If the codes are inputted in the expansion-decoding sections $\mathbf{21}_1$-$\mathbf{21}_I$, the expansion-decoding sections $\mathbf{21}_1$-$\mathbf{21}_I$ decode the first to I-th channel codes, respectively. Predictive synthesizing sections $\mathbf{23}_1$-$\mathbf{23}_I$ perform predictive synthesis of the signals to group them in pairs and inputs the pairs into stereo separators 74. The stereo separators 74 input the separated first to I-th channel reproduction signals in an output selector 87. If the input selector 85 inputs the first to I-th channel codes into the multichannel decoding section 73, the multichannel decoding section 73 decodes them. Predictive synthesizing sections $\mathbf{86}_1$-$\mathbf{86}_I$ predictively synthesize the first to I-th channel reproduction signals and provide them to the output selector 87. The output selector 87 outputs one of the first to I-th channel reproduction signals in accordance with the selection at the input selector 85.

Example of Experiment

An experiment showing the effects of the present invention and the results will be described below.

Figures 22, 23:
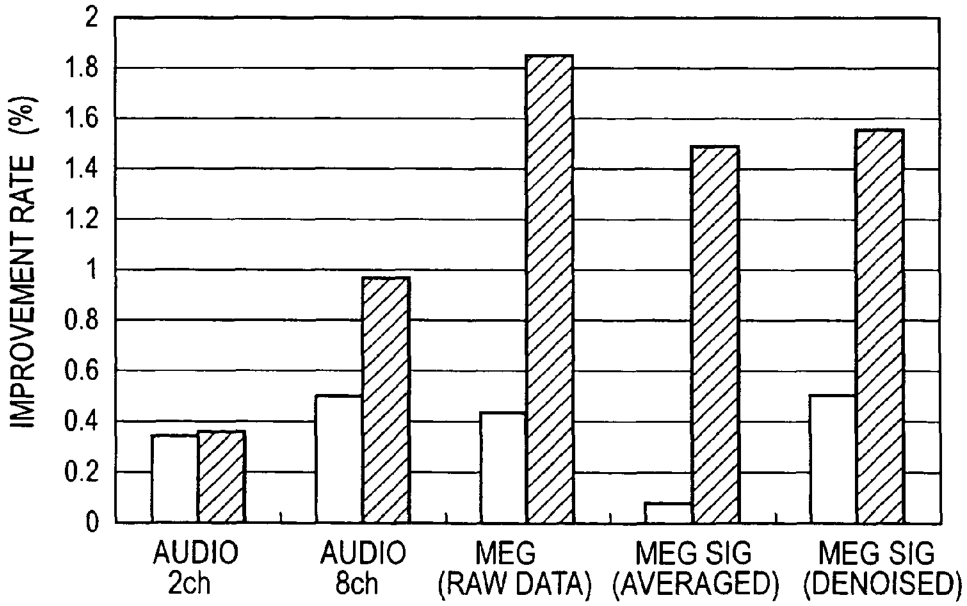
FIG. 22 shows the conditions under which an experiment was conducted in order to confirm the effects of the present invention.
FIG. 23 shows the results of the experiment in FIG. 22.

In the example, the coding method shown in FIG. 6 was applied to 2 channels of audio signals, 8 channels of microphone array (audio) signals, 256 channels of Magnetoencephalograph signals (raw data), 256 channels of Magnetoencephalograph signals (averaged), and 192 channels of Magnetoencephalograph signals (denoised) as shown in FIG. 22. The word length (the number of bits per sample) of each channel signal and the number of samples and sampling frequency of each channel are as shown in FIG. 22. FIG. 23 shows the relative improvement rates of the amounts of codes generated by the multichannel coding according to the present invention and the amounts of codes generated by the coding method shown in FIG. 2, with respect to the amount of code Vu generated by independent coding of each channel. The improvement rate was defined as (Vu−Vp)/Vu×100(%), where Vp denotes the amount of a code compressed by coding. The white bars in FIG. 23 represent the improvement rates by the method shown in FIG. 2 and the hatched bars represent the improvement rates by the method according to the present invention. It can be seen from the bar graph that the present invention is significantly advantageous over the method shown in FIG. 2.

A computer can be caused to function as the coding apparatus and decoding apparatus according to the present invention. For example, to cause a computer to function as the coding apparatus according to the present invention, a program for causing the computer to perform the steps of, for example, the method shown in FIG. 6 recorded on a recording medium such as a CD-ROM, magnetic disk, or semiconductor storage medium may be installed in the computer or the program may be downloaded to the computer over a network, to cause the computer to execute the program.

What is claimed is:

1. A multichannel signal coding apparatus comprising:

a coding determining section which determines for each time-period, hereinafter refereed to as a frame, of an input signal of each channel, the input signal being hereinafter referred to as a channel signal, which of a coding operation on the channel signal itself, the coding operation being hereinafter referred to as independent coding operation, and a coding operation on a weighted difference between the channel signal and a channel signal of another channel, hereinafter referred to as parent, the coding operation being hereinafter referred to as difference coding operation;

waveform coding section which codes a signal to be coded for each channel using the determined coding operation to generate a code string;

a combiner which generates a multichannel code including information as to which of the independent coding operation and difference coding operation is to be performed for each channel, weighting information in the case of the difference coding, and the code string;

a repetition control section which generates a signal of each channel to be coded from a channel signal of the channel in accordance with the coding operation determined at the coding determining section and controls the step of repeating the coding determining section at least once by using the generated signal to be coded as the channel signal of the channel;

the coding determining section which determines that the independent coding is to be performed on a channel signal of at least one channel and determines that the difference coding operation is to be performed on a channel signal of another channel; and the waveform coding section which codes the signal of each channel to be coded obtained at the last repeating step by using the coding operation determined at the last determining step to obtain a code string.

2. A multichannel signal coding apparatus comprising:

a coding determining section which determines for each time-period, hereinafter refereed to as a frame, of an input signal of each channel, the signal being hereinafter referred to as a channel signal, which of a coding operation on the channel signal itself, the coding operation being hereinafter referred to as independent coding operation, and a coding operation on a weighted difference between the channel signal and a channel signal of another channel, hereinafter referred to as parent, the coding operation being hereinafter referred to as difference coding operation;

a waveform coding section which codes a signal to be coded for each channel using the determined coding operation to generate a code string;

a combiner which generates a multichannel code including information as to which of the independent coding operation and difference coding operation is to be performed for each channel and, weighting information in the case of the difference coding, and the code string;

wherein the coding determining section comprises serial processing means for determining that the independent coding operation is to be performed on one channel and determining that the difference coding is to be performed on the difference between another channel and a channel signal of the channel for which it has been determined that the independent coding operation is to be performed; and repeating, for each channel for which a coding operation to be performed is yet to be determined, the step of determining which of the independent coding operation and the difference coding operation with one of the channels for which a coding operation to be performed has already been determined is to be performed until coding operations to be performed are determined for all channels.

3. The multichannel signal coding apparatus according to claim 2, comprising:

a repetition control section which generates a signal of each channel to be coded from channel signal of the channel in accordance with the coding operation determined at the coding determining section and controls the step of repeating the coding determining section at least once by using the generated signal to be coded as the channel signal of the channel; and the waveform coding section which codes the channel signal of each channel to be coded obtained at the last repeating step by using the coding operation determined at the last determining step to obtain a code string.

4. The multichannel signal coding apparatus according to claim 2 or 3, wherein, the coding determining section performs the operations of:

difference signal generating means for generating a weighted difference signal D(i, j) between channel signals $X_i$ of all channels, where i=1, . . . , N and N being an integer greater than or equal to 2 indicating the number of channels, and channel signals $X_j$ of the other channels, where j=1, . . . , N and j≠i;

energy calculating means for calculating the energy of channel signal $X_i$ using the weighted difference signal as $$L(i,j)=\|\Delta(i,j)\|^2+\|X_j\|^2$$

where $\|X_j\|^2$ is the energy of the channel signal $X_j$, $\|\Delta(i,j)\|^2$ is the energy of the weighted difference signal, and a channel j is the parent; and the serial processing means for repeating the operations in ascending order of the values of L(i, j) and $\|\Delta(i,j)\|^2$.

5. A multichannel signal decoding apparatus including a waveform decoding section which decodes a code string of each channel included in an input multichannel code to generate a decoded waveform signal of each channel, the apparatus comprising:

an auxiliary decoding section which decodes information indicating, for each frame of each channel contained in the input multichannel code, whether the channel signal has been coded by a coding operation on the channel signal itself, the coding operation being hereinafter referred to as independent coding, or a coding operation on a weighted difference between the channel signal and a channel signal of another channel, hereinafter referred to as parent, has been coded, the coding operation being hereinafter referred to as difference coding operation, and information about a weight in the case of the difference coding;

a repetitive reproducing section which if the channel is an independent coding applied channel, provides a decoded waveform signal of the channel as a decoded channel signal, and if the channel is a difference coding applied channel and a decoded channel signal of the parent of the channel has been obtained, adds the decoded waveform signal of the channel to a weighted decoded channel signal of the parent to provide a decoded channel signal.

6. A multichannel signal decoding apparatus including a waveform decoding section which decodes a code string of each channel included in an input multichannel code to generate a decoded waveform signal, the apparatus comprising:

an auxiliary decoding section which decodes information contained in the input multichannel code that indicates whether each channel has been coded by a coding operation on the channel signal itself, the coding operation being hereinafter referred to as independent coding, or a coding operation on a weighted difference between the channel signal and a signal of another channel, hereinafter referred to as parent, has been coded the coding operation being hereinafter referred to as difference coding operation, and information about a weight in the case of the difference coding contained, and obtains the number of stages containing the information;

a repetitive reproducing section which directly provides a decoded waveform signal of a channel as a decoded channel if the channel is an independent coding applied channel, or adds the decoded waveform signal to a weighted decoded channel signal of the parent of the channel to provide a decoded channel signal if the channel is a difference coding applied channel;

a selecting section which re-inputs the decoded channel signal of each channel obtained at the repetitive reproducing section into the repetitive reproducing section as the decode waveform; and a repetition control section which controls the repetitive reproducing section to repeat the operation of the repetitive reproducing section as many times as the number of stages obtained at the auxiliary decoding section.

7. A multichannel signal decoding apparatus including a waveform decoding section which decodes a code string of each channel included in an input multichannel code to generate a decoded waveform signal of each channel, the apparatus comprising:

an auxiliary decoding section which decodes information contained in the input multichannel code that indicates whether each channel has been coded by a coding operation on the channel signal itself, the coding operation being hereinafter referred to as independent coding, or a coding operation on a weighted difference between the channel signal and a signal of another channel, hereinafter referred to as parent, has been coded, the coding operation being hereinafter referred to as difference coding operation, and information about a weight in the case of the difference coding contained, and obtains the number of stages containing the information;

a repetitive reproducing section which repeats, until decoded signal of all channels are obtained an operation in which a decoded waveform signal of a channel as a decoded channel signal is directly provided if the channel is an independent coding coded channel, and the decoded waveform signal of a channel is added to a weighted decoded channel signal of the parent of the channel to provide a decoded channel signal if the channel is a difference coding applied channel and if the decoded channel signal of the parent has been obtained;

a selecting section which re-inputs the decoded channel signal of each channel obtained at the repetitive reproducing section in the repetitive reproducing section as the decoded waveform signal of each channel; and a repetition control section which controls the repetitive reproducing section to repeat the operation of the repetitive reproducing section as many times as the number of stages obtained at the auxiliary decoding section.

8. A multichannel signal decoding apparatus including a waveform decoding section which decodes a code string of each channel included in an input multichannel code to generate a decoded waveform signal of each channel, the apparatus comprising:

an auxiliary decoding section which decodes information contained in the input multichannel code that indicates whether each channel has been coded by a coding operation on the channel signal itself, the coding operation being hereinafter referred to as independent coding, or a coding operation on a weighted difference between the channel signal and a signal of another channel, hereinafter referred to as parent, has been coded, the coding operation being hereinafter referred to as difference coding operation, and information about a weight in the case of the difference coding contained, and obtains the number of stages containing the information;

a repetitive reproducing section which repeats, until decoded channel signals of all channels are obtained, an operation in which decoded waveform signals of all independent coding applied channels are directly provided as decoded channel signals, and if a decoded channel signal has not yet been obtained for the channel and the decoded channel signal of the parent of the channel has been obtained, a decoded waveform signal of a channel is added to a weighted decoded channel signal of the parent of the channel to provide as a decoded channel signal of the channel;

a selecting section which re-inputs the decoded channel signal of each channel obtained at the repetitive reproducing section into the repetitive reproducing section as the decode waveform; and a repetition control section which controls the repetitive reproducing section to repeat the operation of the repetitive reproducing section as many times as the number of stages obtained at the auxiliary decoding section.

* * * * *